United States Patent
Shimokawa et al.

(10) Patent No.: US 10,305,333 B2
(45) Date of Patent: May 28, 2019

(54) POWER RECEIVER, WIRELESS POWER TRANSFER SYSTEM, AND KQ-VALUE CALCULATION METHOD

(71) Applicant: FUJITSU LIMITED, Kawasaki-shi, Kanagawa (JP)

(72) Inventors: Satoshi Shimokawa, Kawasaki (JP); Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 15/350,243

(22) Filed: Nov. 14, 2016

(65) Prior Publication Data
US 2017/0063166 A1    Mar. 2, 2017

Related U.S. Application Data

(63) Continuation of application No. PCT/JP2014/063583, filed on May 22, 2014.

(51) Int. Cl.
*H02J 7/02* (2016.01)
*H02J 50/12* (2016.01)
(Continued)

(52) U.S. Cl.
CPC .............. *H02J 50/80* (2016.02); *H02J 17/00* (2013.01); *H02J 50/12* (2016.02); *H02J 50/40* (2016.02);
(Continued)

(58) Field of Classification Search
None
See application file for complete search history.

(56) References Cited

U.S. PATENT DOCUMENTS

2011/0316347 A1    12/2011    Endo
2012/0049645 A1    3/2012    Kozakai
(Continued)

FOREIGN PATENT DOCUMENTS

CA    2868101 A1    10/2013
JP    2011-211854 A1    10/2011
(Continued)

OTHER PUBLICATIONS

International Search Report for International Application No. PCT/JP2014/063583 dated Aug. 19, 2014.
(Continued)

*Primary Examiner* — Jared Fureman
*Assistant Examiner* — Joel Barnett
(74) *Attorney, Agent, or Firm* — Kratz, Quintos & Hanson, LLP

(57) ABSTRACT

A power receiver which wirelessly receives power from at least one power source using one of magnetic field resonance and electric field resonance, including a power receiver coil, an internal circuit, a power detection resistor, a switch, a power reception control unit, and a communication circuit unit. The power receiver coil wirelessly receives the power from the power source, and the internal circuit uses the power obtained by the power receiver coil. The power detection resistor detects the power obtained by the power receiver coil, and the switch applies a received power voltage obtained by the power receiver coil by switching to the power detection resistor. The power reception control unit controls the power detection resistor and the switch, and the communication circuit unit performs communication with the power source, comprising detection information of a received power and power supply timing information.

13 Claims, 22 Drawing Sheets

(51) Int. Cl.
*H02J 50/40* (2016.01)
*H02J 50/80* (2016.01)
*H02J 50/90* (2016.01)
*H02J 17/00* (2006.01)
*H04B 5/00* (2006.01)

(52) U.S. Cl.
CPC ......... *H04B 5/0037* (2013.01); *H04B 5/0081* (2013.01); *H02J 7/025* (2013.01); *H02J 50/90* (2016.02)

(56) References Cited

U.S. PATENT DOCUMENTS

| | | | |
|---|---|---|---|
| 2012/0288019 A1* | 11/2012 | Okamura | H02J 5/005 375/259 |
| 2013/0009650 A1* | 1/2013 | Sakakibara | B60L 3/00 324/546 |
| 2013/0027078 A1 | 1/2013 | Nakano | |
| 2013/0063160 A1 | 3/2013 | Nakano | |
| 2013/0099586 A1* | 4/2013 | Kato | H02J 7/025 307/104 |
| 2013/0249305 A1 | 9/2013 | Kudo | |
| 2013/0313893 A1 | 11/2013 | Ichikawa | |
| 2014/0084688 A1 | 3/2014 | Tzanidis | |
| 2015/0035376 A1* | 2/2015 | Baarman | H02J 5/005 307/104 |
| 2016/0372963 A1* | 12/2016 | Sankar | H02J 50/05 |

FOREIGN PATENT DOCUMENTS

| | | |
|---|---|---|
| JP | 2012-010586 A1 | 1/2012 |
| JP | 2012-049434 A1 | 3/2012 |
| JP | 2013-027255 A1 | 2/2013 |
| JP | 2013-059236 A1 | 3/2013 |
| JP | 2013-090483 A1 | 5/2013 |
| JP | 2013-198327 A1 | 9/2013 |
| WO | 2009/014125 A1 | 1/2009 |
| WO | 2012085119 A2 | 6/2012 |

OTHER PUBLICATIONS

Written Opinion of the International Searching Authority for International Application No. PCT/JP2014/063583 dated Aug. 19, 2014 (5 Sheets, 4 Sheets translation; 9 Sheets total).

Extended European Search Report for corresponding EP Patent Application No. 14892515.9 dated Dec. 11, 2017 (10 Sheets).

Office Action of CN Patent Application No. 201480078942X, dated Jun. 27, 2018 (21 Sheets).

Office Action of Japanese Patent Application No. 2016-520876 dated Aug. 25, 2017 (dated Sep. 5, 2017)/ (3 Sheets, 4 Sheets translation, 7 Sheets total).

Office Action of KR Patent Application No. 10-2016-7031880 dated Oct. 11, 2017 with English translation (Korean 6 pages) (translation 6 pages).

Office Action of Chinese Patent Application No. 201480078942.X dated Jan. 28, 2019 (7 pages, 9 pages translation, 16 pages total).

\* cited by examiner

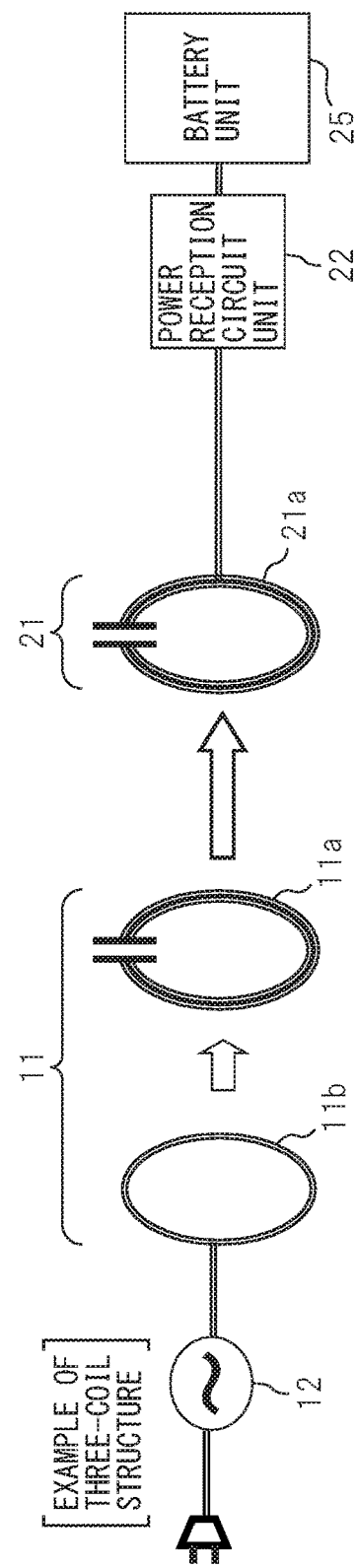

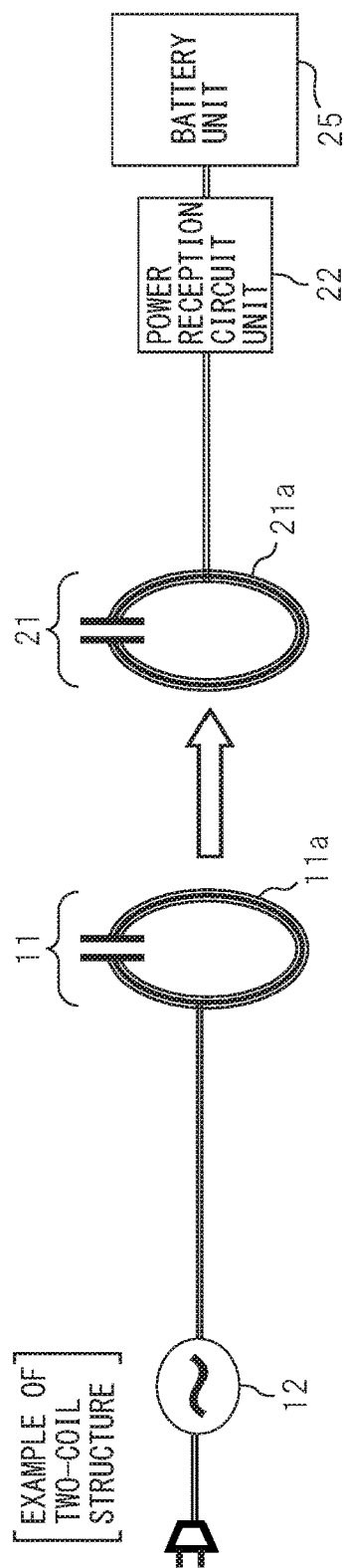

[IN-PHASE OUTPUT]

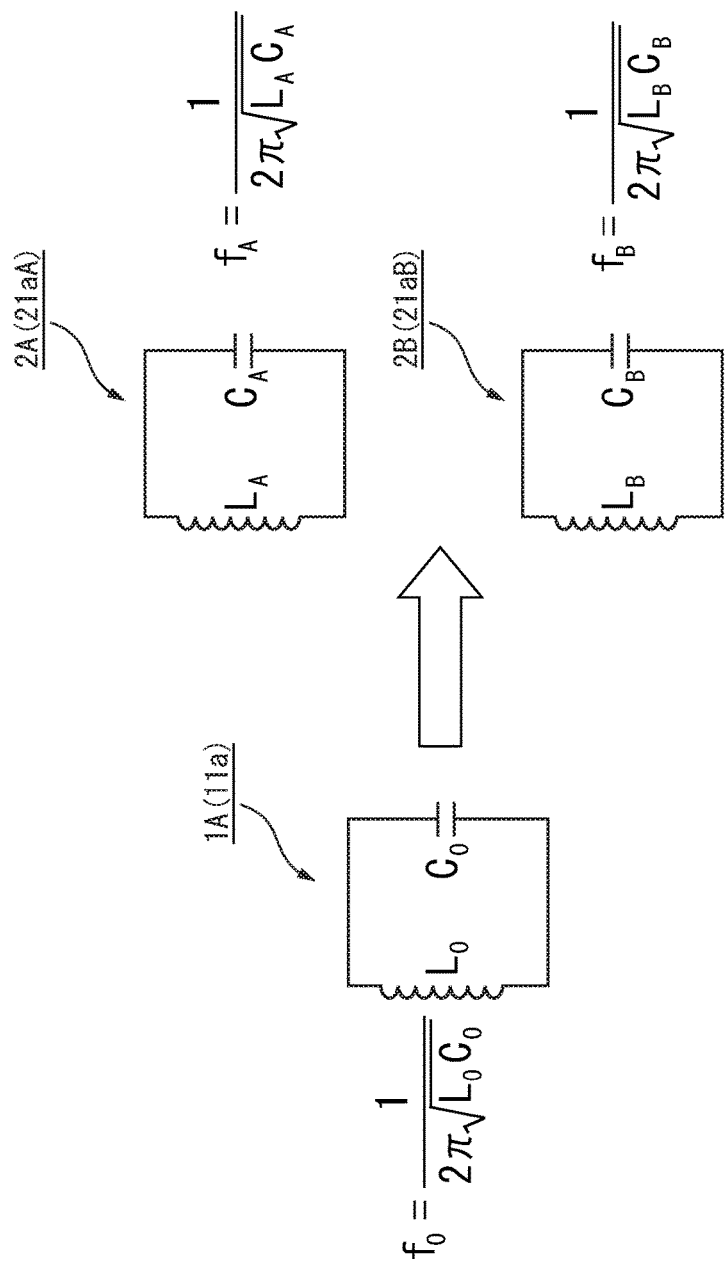

POWER RECEIVER, WIRELESS POWER TRANSFER SYSTEM, AND KQ-VALUE CALCULATION METHOD

CROSS-REFERENCE TO RELATED APPLICATION

This application is a continuation application and is based upon PCT/JP2014/063583, filed on May 22, 2014, the entire contents of which are incorporated herein by reference.

FIELD

Embodiments discussed herein relate to a power receiver, a wireless power transfer system, and a kQ-value calculation method.

BACKGROUND

In recent years, in order to perform power supply or perform charging, wireless power transfer techniques have been gaining attention. Research and development are being conducted regarding a wireless power transfer system wirelessly performing power transfer to various electronic apparatuses such as mobile terminals and notebook computers and household electrical appliances or to power infrastructure equipment.

When wireless power transfer is used, standardization is preferably performed so that power sources which transmit power and power receivers which receive the power transmitted from the power sources are used without trouble even when they are products manufactured by different manufacturers.

Conventionally, techniques using electromagnetic induction, and techniques using radio waves are generally known as wireless power transfer techniques.

Recently, wireless power transfer techniques using strong coupling resonance have been attracting attention as techniques being capable of transferring power to a plurality of power receivers while placing each power receiver at a certain distance from a power source, or to various three-dimensional positions of each power receiver.

Wireless power transfer techniques using magnetic field resonance or electric field resonance, for example, are known as this kind of wireless power transfer using strong coupling resonance.

Conventionally, in order to perform power supply or perform charging, wireless power transfer techniques for wirelessly transferring power have been gaining attention, as described earlier. A wireless power transfer system which employs such a wireless power transfer technique normally transfers power to a plurality of power receivers and may involve power transfer control based on, for example, the power required by each power receiver or the positional relationship of each power receiver relative to the power source.

In recent years, power supply control which uses kQ values in power sources (power source coils) and power receivers is being researched and developed. Specifically, for example, research is being conducted to perform wireless power transfer by switching, based on the kQ values, between a time-division power transfer mode in which power is sequentially transferred to a plurality of power receivers and a simultaneous power transfer mode in which power is simultaneously transferred to a plurality of power receivers.

A research is also being conducted for detuning by grouping a plurality of power receivers or shifting the resonance point of a power receiver (a power receiver resonance coil) on the basis of the kQ values. In the future, a variety of proposals to use kQ values are expected to be made in wireless power transfer systems.

The kQ value (kQ) is the product of the k value (k) indicating the degree of coupling of electromagnetic fields (magnetic fields or electric fields) and the Q value (Q) indicating the degree of loss of an electromagnetic field. The larger the k value, the higher the degree of coupling, and the larger the Q value, the lower the degree of loss.

Unfortunately, in the wireless power transfer system, it is difficult to accurately calculate (obtain) a k value, and accordingly a kQ value with each power receiver and no useful proposals have currently been made.

A variety of wireless power transfer techniques have conventionally been proposed.

Patent Document 1: International Publication No. WO 2009/014125 pamphlet

Patent Document 2: Japanese Laid-open Patent Publication No. 2013-198327

SUMMARY

According to an aspect of the embodiments, there is provided a power receiver which wirelessly receives power from at least one power source using one of magnetic field resonance and electric field resonance, the power receiver including a power receiver coil, an internal circuit, a power detection resistor, a switch, a power reception control unit, and a communication circuit unit.

The power receiver coil wirelessly receives the power from the power source, the internal circuit uses the power obtained by the power receiver coil, and the power detection resistor detects the power obtained by the power receiver coil.

The switch applies a received power voltage obtained by the power receiver coil by switching to the power detection resistor, the power reception control unit controls the power detection resistor and the switch, and the communication circuit unit performs communication with the power source, including detection information of a received power and power supply timing information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram (1) for illustrating a modified example of a transmission coil in the wireless power transfer system of FIG. 3.

FIG. 4C is a diagram (3) for illustrating a modified example of the transmission coil in the wireless power transfer system of FIG. 3.

FIG. 9B is a diagram (2) for illustrating one example of the two-dimensional wireless power transfer control method for the plurality of power receivers.

DESCRIPTION OF EMBODIMENTS

First, before describing embodiments of a power receiver, a wireless power transfer system, and a kQ-value calculation method in detail, an example of a power transfer system and a wireless power transfer system including a plurality of power sources and a plurality of power receivers according to a related art will be described, with reference to FIG. 1 to FIG. 12C.

Figure 1A:
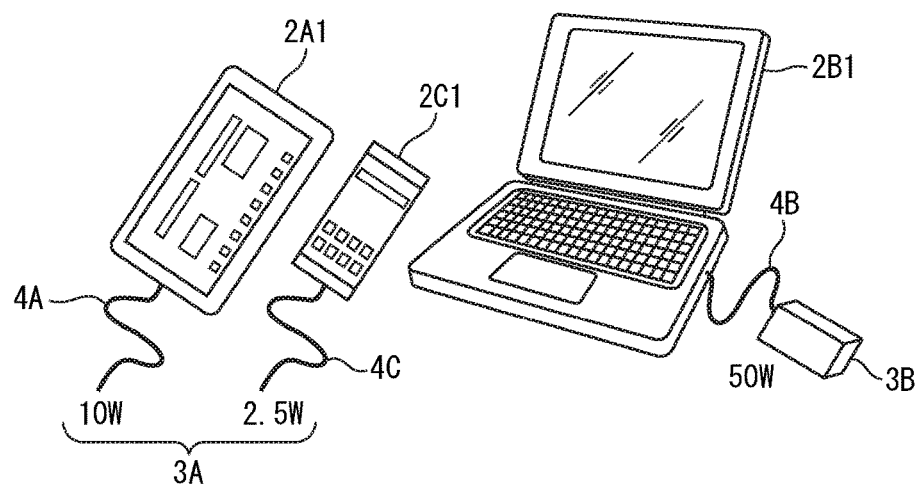
FIG. 1A is a diagram schematically depicting one example of a wired power transfer system.
Figure 1B:
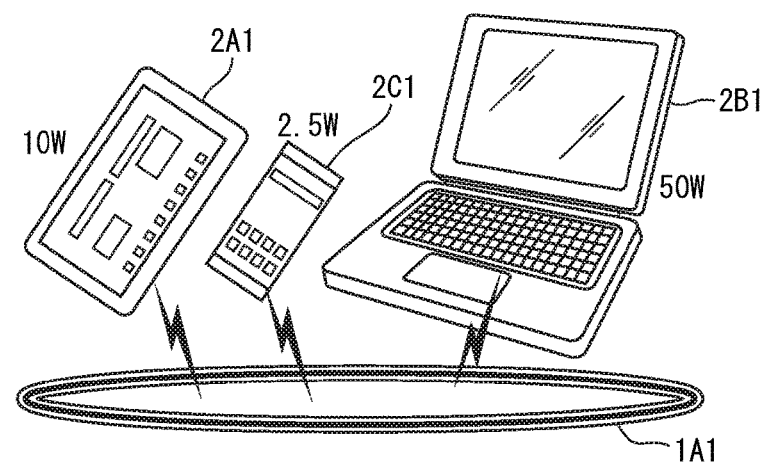
FIG. 1B is a diagram schematically depicting one example of a wireless power transfer system.

FIG. 1A is a diagram schematically depicting one example of a wired power transfer (wired power supply) system and FIG. 1B is a diagram schematically depicting one example of a wireless power transfer (wireless power supply) system. Referring to FIG. 1A and FIG. 1B, reference signs 2A1 to 2C1 denote power receivers.

The power receiver 2A1 represents, for example, a tablet computer (tablet) having a power requirement of 10 W, the power receiver 2B1 represents, for example, a notebook computer having a power requirement of 50 W, and the power receiver 2C1 represents, for example, a smartphone having a power requirement of 2.5 W. The power requirements correspond to, for example, powers for charging the rechargeable batteries (secondary batteries) in the respective power receivers 2A1 to 2C1.

As depicted in FIG. 1A, generally, when the secondary batteries of the tablet 2A1 and the smartphone 2C1 are charged, for example, the tablet 2A1 and the smartphone 2C1 are connected to a USB (Universal Serial Bus) terminal (or a dedicated power supply or the like) 3A of a Personal Computer via power supply cables 4A and 4C. When the secondary battery of the notebook computer 2B1 is charged, for example, the notebook computer 2B1 is connected to a dedicated power supply (AC-DC Converter) 3B via a power supply cable 4B.

In other words, even for the portable power receivers 2A1 to 2C1, power supply (wired power transfer) is generally performed by wire connection from the USB terminal 3A and the power supply 3B using the power supply cables 4A to 4C, as depicted in FIG. 1A.

In this case, for example, since the power supply cables 4A to 4C are connected to the power receivers 2A1 to 2C1, respectively, via connectors, detecting, for each connector, a power receiver (connection device) connected to the end of the connector may detect the number of devices and fix the supplied power in accordance with the connector shape. The user connects a power supply cable in accordance with the power requirement to recognize the power requirement and appropriately supply power to each connection device.

With the recent advance in non-contact power supply technology typified by electromagnetic induction, for example, wireless power supply (wireless power transfer) has come into practice in a shaver or an electric toothbrush. For example, power may be wirelessly transferred from a power source 1A1 to the tablet 2A1, the notebook computer 2B1, and the smartphone 2C1, as depicted in FIG. 1B.

Figure 2A:
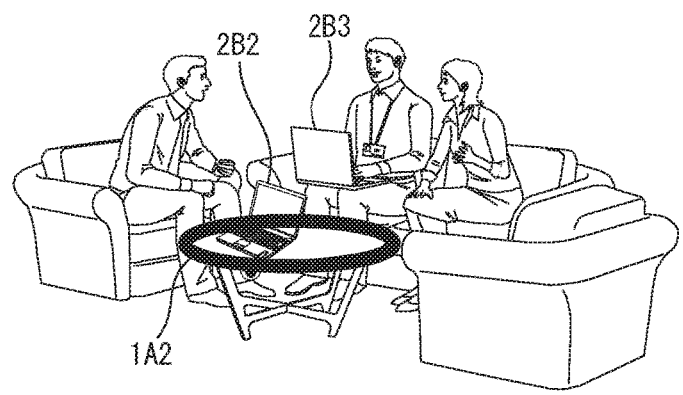
FIG. 2A is a diagram schematically depicting one example of a two-dimensional wireless power transfer system.

FIG. 2A is a diagram schematically depicting one example of a two-dimensional wireless power transfer (two-dimensional wireless power supply) system, and illustrates, for example, how power is wirelessly transferred by electromagnetic induction, as in, for example, the above-mentioned shaver or electric toothbrush.

As depicted in FIG. 2A, when power is wirelessly transferred using electromagnetic induction, power may be supplied to only a power receiver which is nearly in contact with a power source 1A2 because of the short power transfer distance even in non-contact power supply.

In other words, although power may be supplied to a power receiver (notebook computer) 2B2 placed on the power source (power receiver mount) 1A2, it is difficult to supply power to a notebook computer 2B3 separated from the power receiver mount 1A2. In this manner, the wireless power transfer system depicted in FIG. 2A serves as a two-dimensional wireless power supply system which enables free arrangement on the power receiver mount 1A2.

Figure 2B:
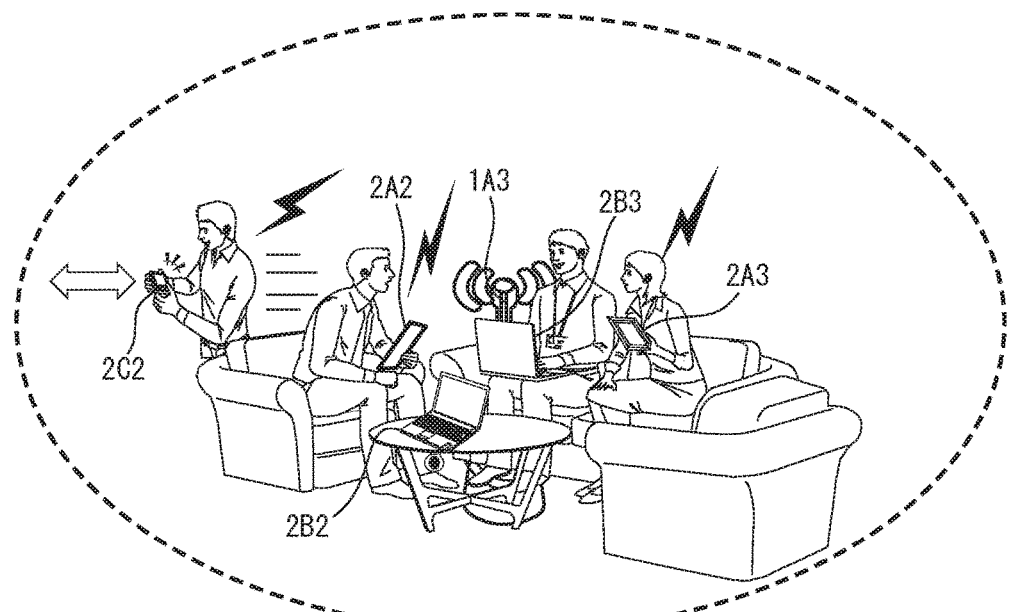
FIG. 2B is a diagram schematically depicting one example of a three-dimensional wireless power transfer system.

FIG. 2B is a diagram schematically depicting one example of a three-dimensional wireless power transfer (three-dimensional wireless power supply) system, and illustrates, for example, how power is wirelessly transferred using magnetic field resonance or electric field resonance. As depicted in FIG. 2B, when power is wirelessly transferred using magnetic field resonance or electric field resonance, power may be supplied from the power source 1A2 to a plurality of power receivers which fall within a predetermined range (the interior of a broken line in FIG. 2B).

In other words, power may be wirelessly transferred from a power source 1A3 to tablets 2A2 and 2A3, the notebook computers 2B2 and 2B3, and a smartphone 2C2 that fall within a predetermined range. Although FIG. 2B depicts only one power source 1A3, a plurality of power sources wirelessly transfer power to a plurality of power receivers at various angles and positions, using magnetic field resonance or electric field resonance.

In this manner, the wireless power transfer system depicted in FIG. 2B serves as, for example, a three-dimensional wireless power supply system which uses magnetic field resonance to enable a high power transfer efficiency even in a space farther than that using electromagnetic induction.

Figure 3:
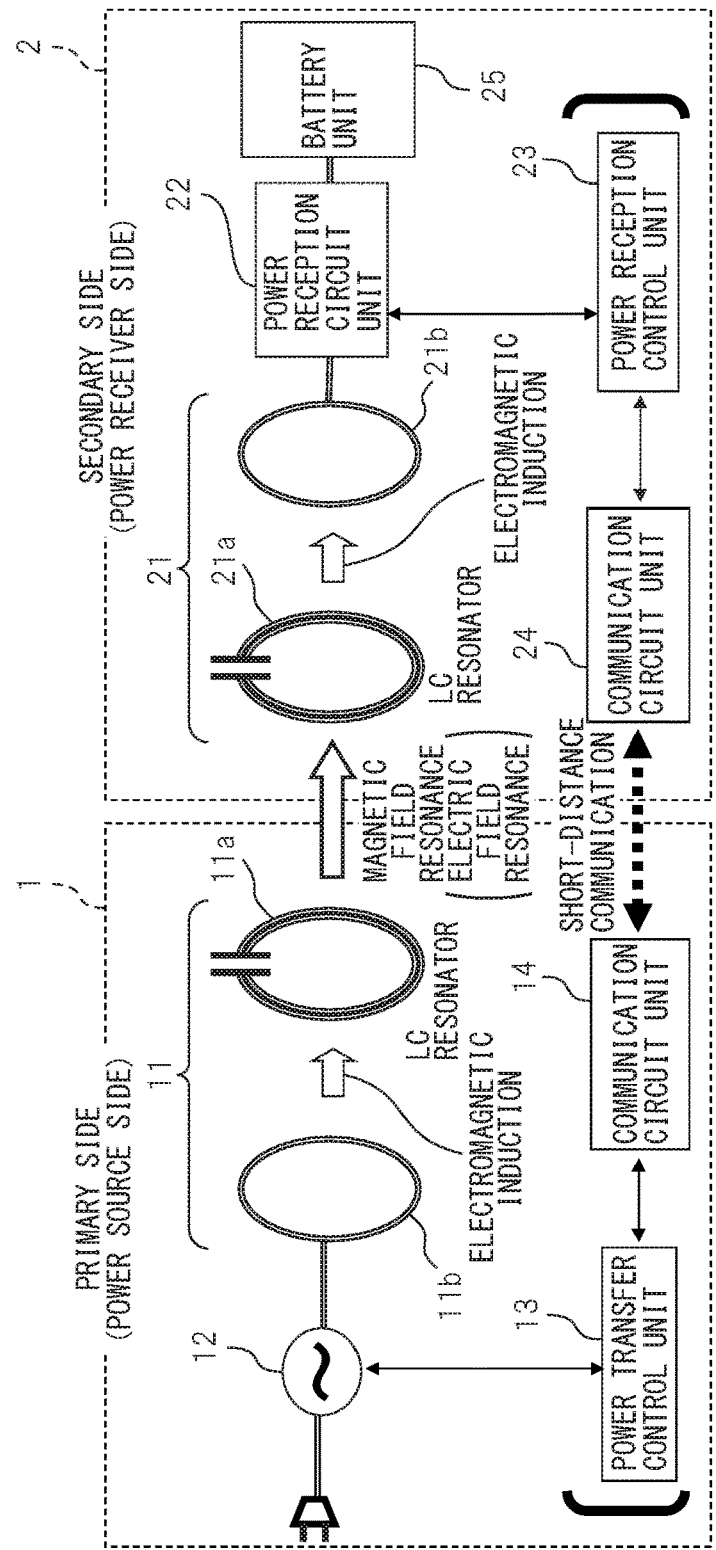
FIG. 3 is a block diagram schematically depicting one example of a wireless power transfer system.

FIG. 3 is a block diagram schematically depicting one example of a wireless power transfer (three-dimensional wireless power supply) system. In FIG. 3, reference sign 1 denotes a primary side (a power source side: a power source), and reference sign 2 denotes a secondary side (a power receiver side: a power receiver).

As depicted in FIG. 3, the power source 1 includes a wireless power transfer unit 11, a high frequency power supply unit 12, a power transfer control unit 13, and a communication circuit unit (a first communication circuit unit) 14. In addition, the power receiver 2 includes a wireless power reception unit 21, a power reception circuit unit (a rectifier unit) 22, a power reception control unit 23, and a communication circuit unit (a second communication circuit unit) 24.

The wireless power transfer unit 11 includes a first coil (a power supply coil) 11b and a second coil (a power source resonance coil: a power source coil) 11a, and the wireless power reception unit 21 includes a third coil (a power receiver resonance coil: a power receiver coil) 21a and a fourth coil (a power extraction coil) 21b.

As depicted in FIG. 3, the power source 1 and the power receiver 2 perform energy (electric power) transmission from the power source 1 to the power receiver 2 by magnetic field resonance (electric field resonance) between the power source resonance coil 11a and the power receiver resonance coil 21a. Power transfer from the power source resonance coil 11a to the power receiver resonance coil 21a may be performed not only by magnetic field resonance but also electric field resonance or the like. However, the following description will be given mainly by way of example of magnetic field resonance.

The power source 1 and the power receiver 2 communicate with each other (near field communication) by the communication circuit unit 14 and the communication circuit unit 24. Note that, a distance of power transfer (a power transfer range) by the power source resonance coil 11a of the power source 1 and the power receiver resonance coil 21a of the power receiver 2 is set to be shorter than a distance of communication (a communication range) by the communication circuit unit 14 of the power source 1 and the communication circuit unit 24 of the power receiver 2.

In addition, power transfer by the power source resonance coil 11a and the power receiver resonance coil 21a is performed by a system (an out-band communication) independent from communication by the communication circuit units 14 and 24. Specifically, power transfer by the resonance coils 11a and 21a uses, for example, a frequency band of 6.78 MHz, whereas communication by the communication circuit units 14 and 24 uses, for example, a frequency band of 2.4 GHz.

The communication by the communication circuit units 14 and 24 may use, for example, a DSSS wireless LAN system based on IEEE 802.11b or Bluetooth (registered trademark).

The above described wireless power transfer system performs power transfer using magnetic field resonance or electric field resonance by the power source resonance coil 11a of the power source 1 and the power receiver resonance coil 21a of the power receiver 2, for example, in a near field at a distance of about ⅙ of a wavelength of a frequency used. Accordingly, the range of power transfer (a power transfer range) varies with the frequency used for power transfer.

The high frequency power supply unit 12 supplies power to the power supply coil (the first coil) 11b, and the power supply coil 11b supplies power to the power source resonance coil 11a arranged very close to the power supply coil 11b by using electromagnetic induction. The power source resonance coil 11a transfers power to the power receiver resonance coil 21a (the power receiver 2) at a power transfer frequency that causes magnetic field resonance between the resonance coils 11a and 21a.

The power receiver resonance coil 21a supplies power to the power extraction coil (the fourth coil) 21b arranged very close to the power receiver resonance coil 21a, by using electromagnetic induction. The power extraction coil 21b is connected to the power reception circuit unit 22 to extract a predetermined amount of power. The power extracted from the power reception circuit unit 22 is used, for example, for charging a battery in a battery unit (load) 25, as a power supply output to the circuits of power receiver 2, or the like.

Note that, the high frequency power supply unit 12 of the power source 1 is controlled by the power transfer control unit 13, and the power reception circuit unit 22 of the power receiver 2 is controlled by the power reception control unit 23. Then, the power transfer control unit 13 and the power reception control unit 23 are connected via the communication circuit units 14 and 24, and adapted to perform various controls so that power transfer from the power source 1 to the power receiver 2 may be performed in an optimum state.

Figure 4B:
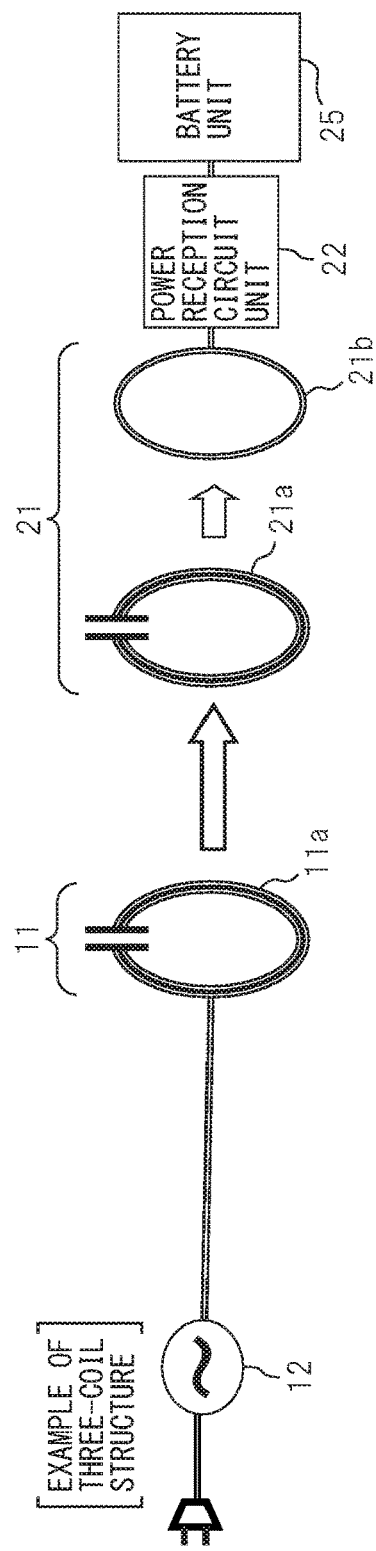
FIG. 4B is a diagram (2) for illustrating a modified example of the transmission coil in the wireless power transfer system of FIG. 3.

FIG. 4A to FIG. 4C are diagrams for illustrating modified examples of a transmission coil in the wireless power transfer system of FIG. 3. Note that, FIG. 4A and FIG. 4B depict exemplary three-coil structures, and FIG. 4C depicts an exemplary two-coil structure.

Specifically, in the wireless power transfer system depicted in FIG. 3, the wireless power transfer unit 11 includes the first coil 11b and the second coil 11a, and the wireless power reception unit 21 includes the third coil 21a and the fourth coil.

On the other hand, in the example of FIG. 4A, the wireless power reception unit 21 is set as a single coil (a power receiver resonance coil: an LC resonator) 21a, and in the example of FIG. 4B, the wireless power transfer unit 11 is set as a single coil (a power source resonance coil: an LC resonator) 11a.

Further, in the example of FIG. 4C, the wireless power reception unit 21 is set as a single power receiver resonance coil 21a and the wireless power transfer unit 11 is set as a single power source resonance coil 11a. Note that, FIG. 4A to FIG. 4C are merely examples and, obviously, various modifications may be made.

FIG. 5A to FIG. 5D are circuit diagrams depicting examples of an independent resonance coil (the power receiver resonance coil 21a), and FIG. 6A to FIG. 6D are circuit diagrams depicting examples of a resonance coil (the power receiver resonance coil 21a) connected to a load or a power supply.

Note that, FIG. 5A to FIG. 5D correspond to the power receiver resonance coil 21a of FIG. 3 and FIG. 4B, and FIG. 6A to FIG. 6D correspond to the power receiver resonance coil 21a of FIG. 4 and FIG. 4C.

Figure 5A:
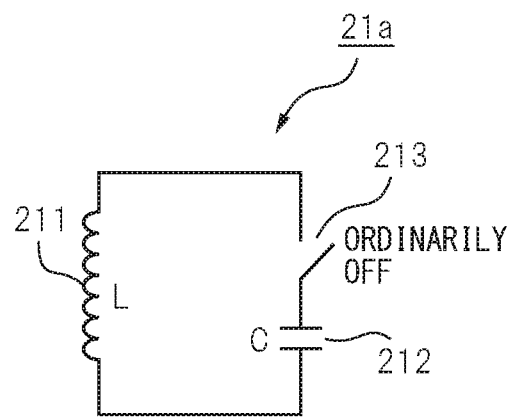
FIG. 5A is a circuit diagram (1) depicting an example of an independent resonance coil.
Figure 5B:
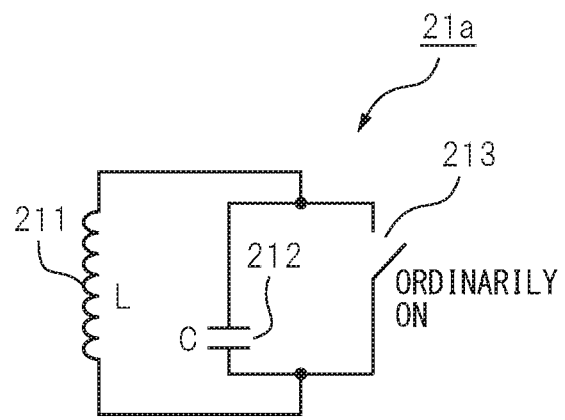
FIG. 5B is a circuit diagram (2) depicting an example of the independent resonance coil.
Figure 6A:
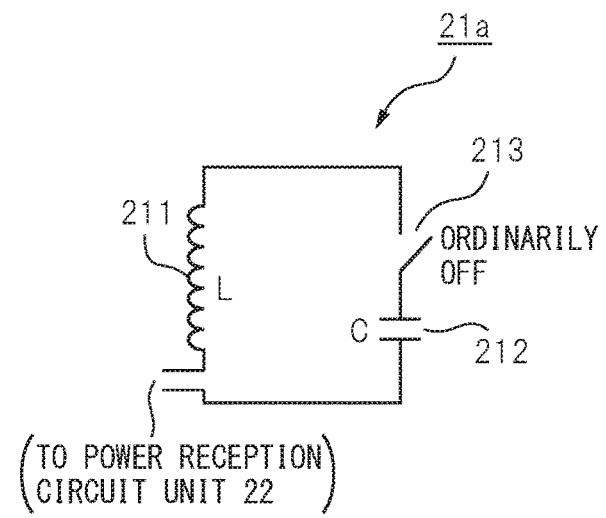
FIG. 6A is a circuit diagram (1) depicting an example of a resonance coil connected to a load or a power supply.

In the examples depicted in FIG. 5A and FIG. 6A, the power receiver resonance coil 21a includes a coil (L) 211, a capacitor (C) 212, and a switch 213 connected in series, in which the switch 213 is ordinarily in an off-state. In the examples depicted in FIG. 5B and FIG. 6B, the power receiver resonance coil 21a includes the coil (L) 211 and the capacitor (C) 212 connected in series, and the switch 213 connected in parallel to the capacitor 212, in which the switch 213 is ordinarily in an on-state.

Figure 5C:
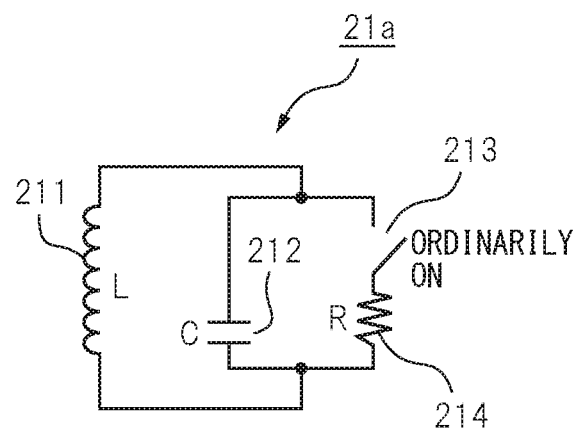
FIG. 5C is a circuit diagram (3) depicting an example of the independent resonance coil.
Figure 6B:
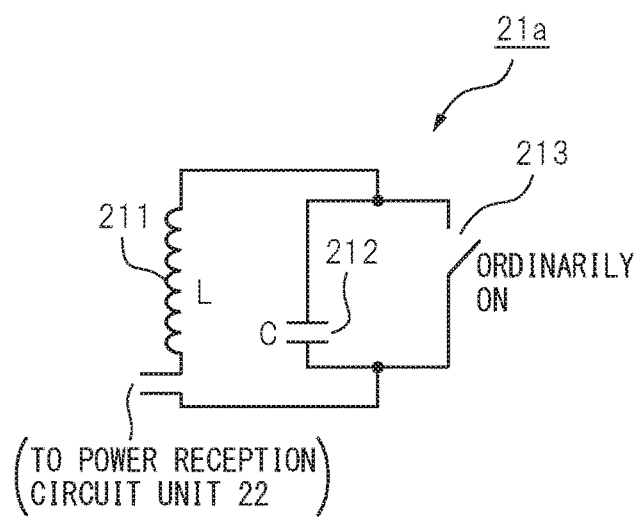
FIG. 6B is a circuit diagram (2) depicting an example of the resonance coil connected to the load or the power supply.
Figure 6C:
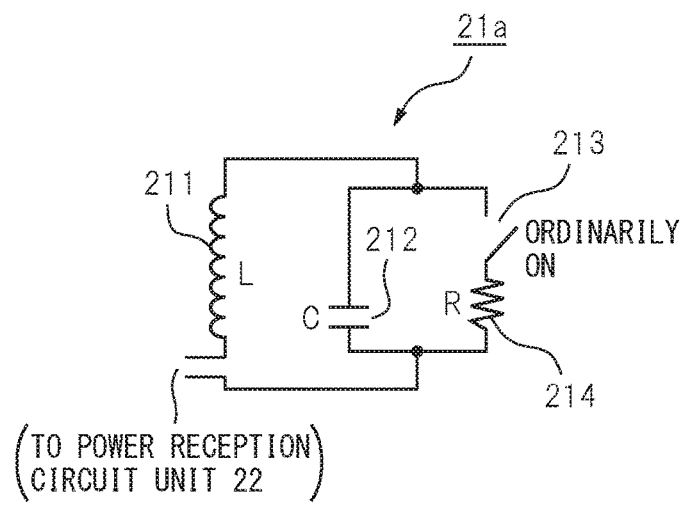
FIG. 6C is a circuit diagram (3) depicting an example of the resonance coil connected to the load or the power supply.

In the examples depicted in FIG. 5C and FIG. 6C, the power receiver resonance coil 21a of FIG. 5B and FIG. 6B includes the switch 213 and the resistance (R) 214 connected in series and arranged in parallel to the capacitor 212, in which the switch 213 is ordinarily in the on-state.

Figure 5D:
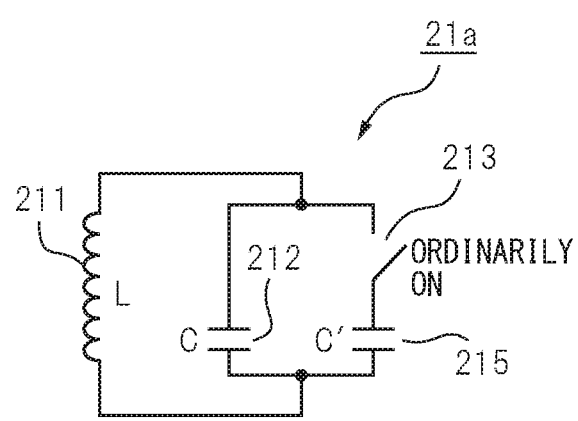
FIG. 5D is a circuit diagram (4) depicting an example of the independent resonance coil.
Figure 6D:
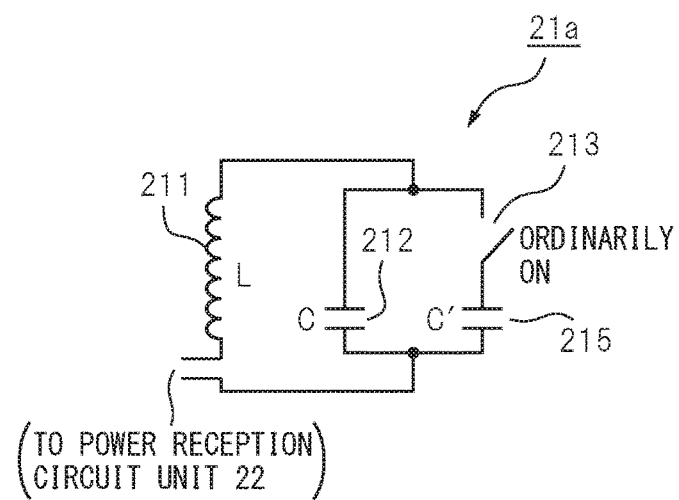
FIG. 6D is a circuit diagram (4) depicting an example of the resonance coil connected to the load or the power supply.

The examples of FIG. 5D and FIG. 6D depict the power receiver resonance coil 21a of FIG. 5B and FIG. 6B, in which the switch 213 and another capacitor (C') 215 connected in series are arranged in parallel to the capacitor 212, and the switch 213 is ordinarily in the on-state.

In each of the power receiver resonance coils 21a described above, the switch 213 is set to "off" or "on" so that the power receiver resonance coil 21a does not operate ordinarily. The reason for this is, for example, to prevent heat generation or the like caused by power transfer to a power receiver 2 not in use (on power receiver) or to a power receiver 2 out of order.

In the above structure, the power source resonance coil 11a of the power source 1 may also be set as in FIG. 5A to FIG. 5D and FIG. 6A to FIG. 6D. However, the power source resonance coil 11a of the power source 1 may be set so as to operate ordinarily and may be controlled to be turned ON/OFF by an output of the high frequency power supply unit 12. In this case, in the power source resonance coil 11a, the switch 213 is to be short-circuited in FIG. 5A and FIG. 6A.

In this manner, when a plurality of power receivers 2 are present, selecting only the power receiver resonance coil 21a of a predetermined power receiver 2 for receiving power transmitted from the power source 1 and making the power receiver resonance coil 21a operable enables power to be transferred (time-division power transfer) to the selected power receiver 2.

Figure 7A:
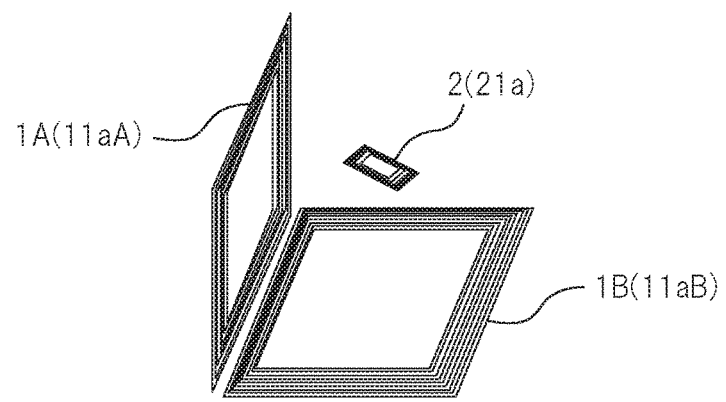
FIG. 7A is a diagram (1) for illustrating an example of controlling a magnetic field by a plurality of power sources.
Figure 7B:
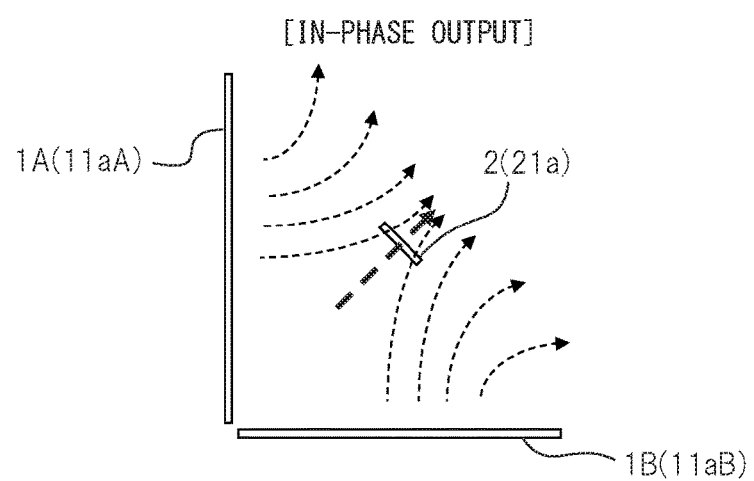
FIG. 7B is a diagram (2) for illustrating an example of controlling a magnetic field by the plurality of power sources.
Figure 7C:
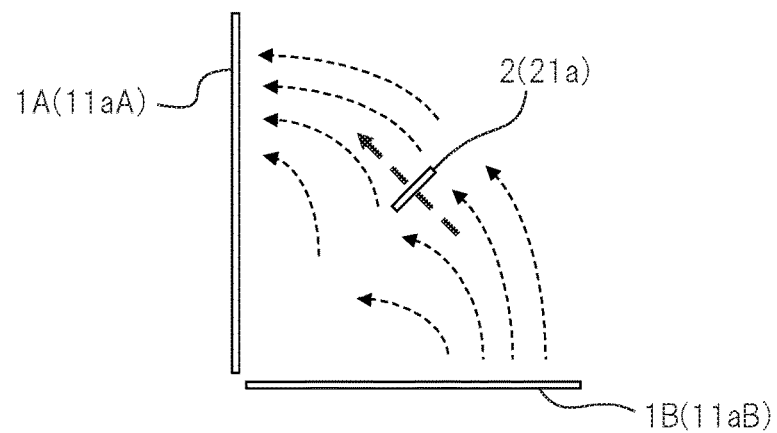
FIG. 7C is a diagram (3) for illustrating an example of controlling a magnetic field by the plurality of power sources.

FIG. 7A to FIG. 7C are diagrams for illustrating examples of controlling a magnetic field by a plurality of power sources. In FIG. 7A to FIG. 7C, reference signs 1A and 1B denote power sources, and reference sign 2 denotes a power receiver.

As depicted in FIG. 7A, a power source resonance coil 11aA for power transfer used for magnetic field resonance of the power source 1A and a power source resonance coil 11aB for power transfer used for magnetic field resonance of the power source 1B are arranged, for example, so as to be orthogonal to each other.

Further, the power receiver resonance coil 21a used for magnetic field resonance of the power receiver 2 is arranged at a different angle (an angle not parallel) at a position surrounded by the power source resonance coils 11aA and 11aB.

Note that, the power source resonance coils (LC resonators) 11aA and 11aB may also be provided in a single power source. In other words, a single power source 1 may include a plurality of wireless power transfer units 11.

FIG. 7B depicts a situation in which the power source resonance coils 11aA and 11aB output an in-phase magnetic field, and FIG. 7C depicts a situation in which the power source resonance coils 11aA and 11aB output a reverse phase magnetic field.

For example, by comparing the cases where the two orthogonal power source resonance coils 11aA and 11aB output an in-phase magnetic field and a reverse phase magnetic field, a synthesized magnetic field becomes a 90° rotation relationship in each other, so that power transfer is carried out to each power receiver 2 (power receiver resonance coil 21a) with suitably transmitting from the power source resonance coils 11aA and 11aB based on the postures of the power receiver 2.

As described above, when power is transferred to the power receiver 2 positioned at an arbitrary position and an arbitrary posture (angle) by the plurality of power sources 1A and 1B, magnetic fields occurring in the power source resonance coils 11aA and 11aB of the power sources 1A and 1B change variously.

The above-mentioned wireless power transfer system includes a plurality of power sources and at least one power receiver and adjusts outputs (strengths and phases) between the plurality of power sources according to positions (X, Y and Z) and postures ($\theta_X$, $\theta_Y$ and $\theta_Z$) of the power receiver.

In addition, it will be seen that, with respect to three-dimensional space, for example, using three or more power sources in the actual three-dimensional space to adjust the respective output phase differences and the output intensity ratios may control the magnetic field (electric field) to any direction in the three-dimensional space.

Figure 8A:
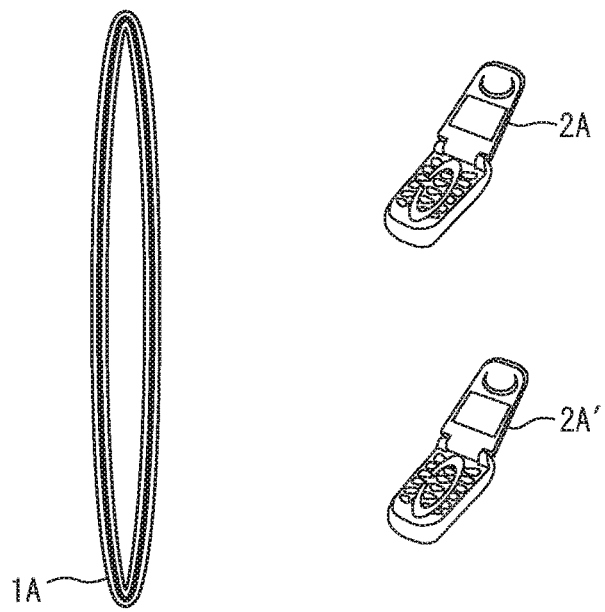
FIG. 8A is a diagram (1) for illustrating wireless power transfer to a plurality of power receivers.
Figure 8B:
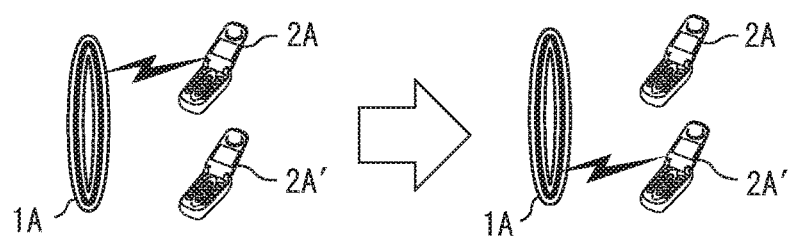
FIG. 8B is a diagram (2) for illustrating wireless power transfer to the plurality of power receivers.
Figure 8C:
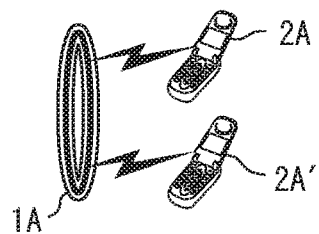
FIG. 8C is a diagram (3) for illustrating wireless power transfer to the plurality of power receivers.

FIG. 8A to FIG. 8C are diagrams for illustrating wireless power transfer to a plurality of power receivers. For the sake of simplicity, although FIG. 8A to FIG. 8C depict only one power source 1A and two power receivers (mobile phones) 2A and 2A', the number of power sources and the number and types of power receivers or the like may obviously vary. In other words, assume that one power source 1A is used to wirelessly supply power to the two power receivers 2A and 2A', as depicted in FIG. 8A.

First, in wireless power supply by time-division power transfer, power is supplied to only one power receiver 2A, as depicted on the left of FIG. 8B, and power is then supplied to only the other power receiver 2A, as depicted on the right of FIG. 8B. The same applies when a larger number of power receivers are used, and power is wirelessly supplied to power receivers by sequentially switching the power receivers to be supplied with power in a time-division manner.

In other words, in time-division power transfer, when a plurality of power receivers are provided, power receivers to be supplied with power are sequentially selected to allow one power receiver to always correspond to the power source at a certain moment. At this time, control may be done as in, for example, the case where power sources and power receivers are provided in one-to-one correspondence. However, as a result of time division, the time taken for power supply (full charging) corresponds to the number of power receivers, and the time to supply power to two power receivers is therefore twice that to supply power to one power receiver.

Then, in wireless power supply by simultaneous power transfer, one power source 1A supplies power to both the two power receivers 2A and 2A', as depicted in FIG. 8C. The same applies when a larger number of power receivers are used, and power is simultaneously, wirelessly supplied to the plurality of power receivers.

In this simultaneous power transfer, when, for example, two power receivers are provided, since power is simultaneously supplied to the two power receivers, and it suffices to supply power for a time corresponding to only one power receiver may be sufficient regardless of the number of power receivers to be simultaneously supplied with power, this power supply method (wireless power transfer control method) is desirable in terms of user benefits.

However, for simultaneous power supply (simultaneous power transfer) to a plurality of power receivers, control is done differently from the case of only one power receiver. Further, in simultaneous power transfer to a plurality of power receivers, power receivers may not always be selected because of problems in terms of, for example, the power transfer upper limit and efficiency. When a large number of power receivers are provided, it is possible to perform simultaneous power transfer to some of the plurality of power receivers while performing time-division power transfer to other power receivers.

Figure 9A:
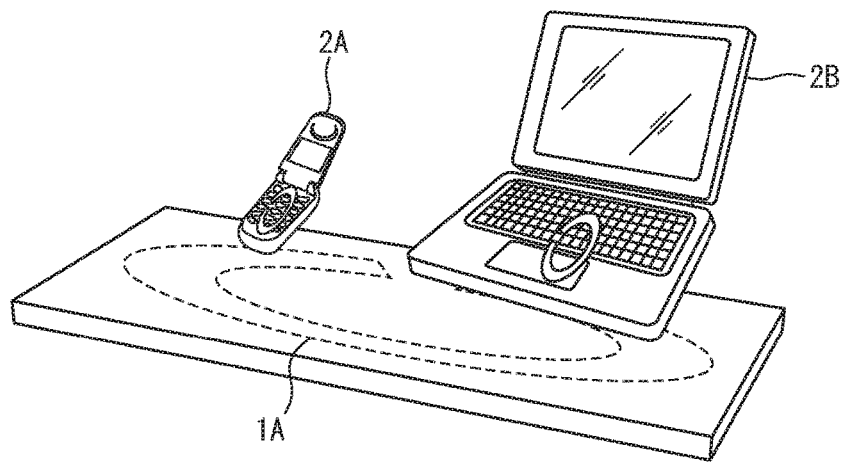
FIG. 9A is a diagram (1) for illustrating one example of a two-dimensional wireless power transfer control method for a plurality of power receivers.
Figure 9C:
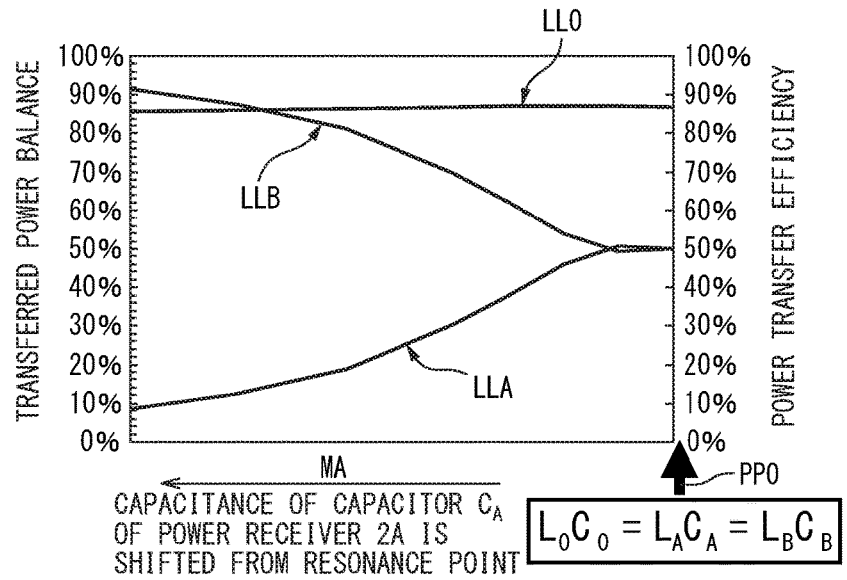
FIG. 9C is a diagram (3) for illustrating one example of the two-dimensional wireless power transfer control method for the plurality of power receivers.

FIG. 9A to FIG. 9C are diagrams for illustrating one example of a two-dimensional wireless power transfer control method for a plurality of power receivers. FIG. 9A illustrates, for example, how power is wirelessly supplied to two power receivers 2A and 2B having different power requirements by one power source 1A, using magnetic field resonance.

FIG. 9B illustrates how power is wirelessly supplied from the power source 1A (the power source resonance coil 11a) to the power receiver 2A (a power receiver resonance coil 21aA) and the power receiver 2B (a power receiver resonance coil 21aB). FIG. 9C illustrates a method for shifting (detuning) the resonance point of the power receiver 2B to control the power distribution ratio.

The power receiver 2A represents, for example, a mobile phone having a power requirement of 5 W and the power receiver 2B represents, for example, a notebook computer having a power requirement of 50 W. For the sake of simplicity, an LC resonator (a wireless power reception unit) for the mobile phone 2A and an LC resonator for the notebook computer 2B have the same specifications. Referring to FIG. 9C, reference sign LL0 denotes the overall power transfer efficiency; LLA, the power received by the mobile phone 2A; and LLB, the power received by the notebook computer 2B.

In simultaneous wireless power supply to a plurality of power receivers, the amount of power received by each power receiver may often be different. For example, as depicted in FIG. 9A, even for a mobile phone having a power requirement of 5 W and a notebook computer having a power requirement of 50 W, or for the same types of power receivers, the power requirement may be different depending on the remaining battery level.

When, for example, the positions or orientations of the power receivers 2A and 2B have only a small difference, and they are equipped with power receiver coils having the same specifications, power is equally distributed. Specifically, let $L_A$ be the inductance in the power receiver resonance coil of the mobile phone 2A, $C_A$ be its capacitance, $L_B$ be the inductance in the power receiver resonance coil of the notebook computer 2B, and $C_B$ be its capacitance.

Then, as indicated by reference sign PP0 in FIG. 9C, $L_0 C_0 = L_A C_A = L_B C_B$ holds in the as-is state (the state in which the resonance point is not shifted). In other words, each resonance frequency in FIG. 9B satisfies $f_0 = f_A = f_B$.

Accordingly, assuming, for example, that the power transferred from the power source 1A is 68.75 W and its power transfer efficiency is 80%, both the mobile phone 2A and the notebook computer 2B receive a power of 27.5 W.

In other words, as depicted in FIG. 9A, even for power receivers 2A and 2B having power requirements different by 10 times, when, for example, an output corresponding to a power requirement of 55 W is output from the power source 1A, the power receivers 2A and 2B each receive a power of 27.5 W.

In this case, since the mobile phone 2A has a power requirement of 5 W and the notebook computer 2B has a power requirement of 50 W, the resonance point of the power receiver resonance coil of the mobile phone 2A is shifted to control the power reception efficiency (ηip) to lower it.

For example, as indicated by an arrow MA in FIG. 9C, the capacitance $C_A$ of the capacitor in the power receiver resonance coil 21aA of the mobile phone 2A is controlled to be reduced (or increased) to make a shift from the resonance point of the power receiver resonance coil that maximizes the power reception efficiency.

In other words, as indicated by the arrow MA in FIG. 9C, intentionally shifting the resonance condition (shifting the capacitance $C_A$) reduces the Q value so that the received power LLA of the mobile phone 2A can be gradually decreased from 27.5 W at the resonance point (P0) and, for example, set to a power requirement of 5 W.

In this case, most of power that is not received by the mobile phone 2A becomes power received by the notebook computer 2B. In other words, obviously, the received power LLB of the notebook computer 2B increases with a reduction in received power LLA of the mobile phone 2A, and the overall power transfer efficiency LL0 in the wireless power transfer system lowers only slightly.

In this manner, changing the resonance condition and, specifically, changing the capacitance value (capacitance $C_A$) of the resonance capacitor (the capacitor) 212 of the power receiver 2A may adjust coupling, thus controlling the received power to a desired distribution ratio.

Importantly, even when the efficiency of the power receiver 2A whose resonance condition has been changed lowers, the power transmission and reception efficiency of the entire system is maintained nearly constant and the power to the power receiver 2B increases by the amount of reduction in power having reached the power receiver 2A. As a result, obviously, compared to single-body power supply to only one of the power receivers 2A and 2B, received power may be distributed at a desired ratio while power is supplied to the entire system (both the power receivers 2A and 2B) at nearly the same efficiency.

In recent years, in a wireless power transfer system including a plurality of power sources (power source coils) and a plurality of power receivers, power supply control which uses kQ values has been attracting attention. Specifically, for example, research is being conducted to perform wireless power transfer by switching, based on the kQ values, between a time-division power transfer mode in which power is sequentially transferred to a plurality of power receivers and a simultaneous power transfer mode in which power is simultaneously transferred to a plurality of power receivers.

A research is also being conducted for detuning by grouping a plurality of power receivers or shifting the resonance point of a power receiver (a power receiver resonance coil) on the basis of the kQ values. A variety of proposals to use kQ values are expected to be made in wireless power transfer systems.

The kQ value (kQ) is the product of the k value (k) indicating the degree of coupling of electromagnetic fields (magnetic fields or electric fields) and the Q value (Q) indicating the degree of loss of an electromagnetic field. The larger the k value, the higher the degree of coupling, and the larger the Q value, the lower the degree of loss.

In other words, kQ is given by the Equation (1) below:

$$kQ = k\sqrt{Q_1 \cdot Q_2} \quad (1)$$

where $Q_1$ is the Q value of the power source and $Q_2$ is the Q value of the power receiver.

k is given by the Equation (2) below:

$$k = \sqrt{\frac{M_{12}}{L_1 \cdot L_2}} \quad (2)$$

where $M_{12}$ is the mutual inductance between the power source and the power receiver, $L_1$ is the self-inductance of the power source, and $L_2$ is the self-inductance of the power receiver.

Q is given by the Equation (3) below:

$$Q_1 = \frac{\omega L_1}{R_1}, Q_2 = \frac{\omega L_2}{R_2} \quad (3)$$

where $\omega$ is the angular frequency, $R_1$ is the loss of the resonance coil of the power source, and $R_2$ is the loss of the resonance coil of the power receiver.

Figure 10:
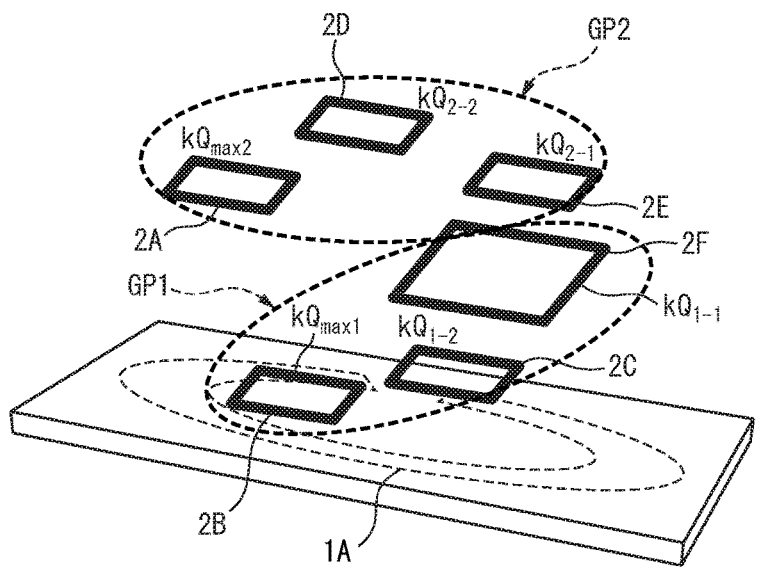
FIG. 10 is a diagram for illustrating one example of a wireless power transfer system which employs kQ values.

FIG. 10 is a diagram for illustrating one example of a wireless power transfer system which employs kQ values and depicts an example in which grouping is performed on the basis of the kQ values. Although FIG. 10 depicts one power source 1A and six power receivers 2A to 2F, this is merely an example, and various cases may occur, as a matter of course.

As depicted in FIG. 10, when, for example, the wireless power transfer system includes six power receivers 2A to 2F, the kQ values (evaluation indices) of the respective power receivers 2A to 2F are evaluated and used for grouping. All the power receivers 2A to 2F are evaluated for each individual first.

When, for example, the power receiver 2A is evaluated, only the power receiver 2A is turned on and the remaining power receivers 2B to 2F are turned off (e.g., the switch 213 in the power receiver resonance coil 21a depicted in FIG. 5A is turned off). Then, for example, with reference to the power receiver 2B having a maximum kQ value ($kQ_{max1}$), power receivers whose $kQ_{other}/kQ_{max1}$ is equal to or larger than a predetermined value for the kQ values ($kQ_{other}$) of the remaining power receivers are determined to belong to the same group. Specifically, referring to FIG. 10, the power receiver 2F whose kQ value is $kQ_{1-1}$ and the power receiver 2C whose kQ value is $kQ_{1-2}$ are determined to belong to a first group GP1.

For the power receivers 2A, 2D, and 2E other than the first group GP1 including the power receiver 2B having a maximum kQ value ($kQ_{max1}$), grouping is similarly performed with reference to the power receiver 2A having a maximum kQ value ($kQ_{max2}$). Specifically, referring to FIG. 10, the power receivers 2A, 2D, and 2E are determined to belong to a second group GP2.

Simultaneous power supply, for example, is performed in the same group for each of the divided groups GP1 and GP2. Regarding the power receivers grouped on the basis of the kQ values, for example, power receivers in a group equal to or less than a threshold undergo time-division power supply. For power receivers in a group equal to or more than a threshold, it is preferable to allow simultaneous power supply by adjusting (detuning) the power distribution in power supply within the same group, while performing time-division power supply to power receivers across different groups.

In general, the power and the efficiency preferably hold a proportional relationship as a requirement of a system capable of wireless power transfer. In other words, a system which transfers high power desirably attains a high efficiency, while a system which transfers low power may have only a low efficiency. This may be easily understood especially in consideration of problems resulting from heat dissipation because losses result in heat generation.

In other words, when a high-power system has a low efficiency, the power to be dissipated is high and it is therefore difficult to construct a system. In other words, the allowable efficiency may be defined in accordance with the transferred power.

Under the circumstances, upon examining whether to perform simultaneous power supply or time-division power supply to a plurality of power receivers having different kQ values, simultaneous power supply may be always desirable when the power transfer completion time is prioritized, but the allowable efficiency varies in each individual system, as described above.

It is practical to devise a method which allows simultaneous power supply while maintaining a given allowable efficiency, and in the present embodiment, power receivers having close kQ values are grouped so that simultaneous power supply is prioritized within the obtained group while time-division power supply is prioritized for power receivers which fall outside this group.

For simultaneous power supply to power receivers having equal (close) kQ values, the power balance may be easily adjusted by slightly changing the Q value, whereas for simultaneous power supply to power receivers having significantly different kQ values, the Q value is considerably reduced for balance adjustment. This leads to degradation in overall efficiency.

Power supply to a notebook computer group and a smartphone group will be considered as one example. A notebook computer group (notebook computers), for example, requires power supply at 30 W (its power requirement is 30 W) and has an allowable minimum efficiency of 80% due to its high power. Since notebook computers have a large size, large power receiver coils may be used and the kQ values may be set large.

A smartphone group (smartphones), for example, requires power supply at 5 W (its power requirement is 5 W) and has an allowable efficiency of 40%. Since smartphones have a small size and are freer to locate, the kQ values are kept small.

Upon simultaneous power supply to such two groups, power is simultaneously supplied to groups having different kQ values, but in fact power is supplied to only the notebook computer group and no power reaches the smartphone group.

In this case, for example, the power balance may be adjusted by reducing the Q values, but then the overall efficiency lowers, and the efficiency of power supply including that for notebook computers, in turn, lowers, and this may degrade the allowable efficiency even to, for example, 80% or less.

This reveals that simultaneous power supply to groups having different kQ values is not preferable. In other words, when three or more power receivers have kQ values (evaluation indices) equal to or larger than a set value, they are grouped on the basis of the kQ values and preferably grouped such that power receivers having close kQ values belong to the same group.

Regarding the power receivers grouped on the basis of the kQ values, for example, power receivers in a group equal to or less than a threshold undergo time-division power supply. For power receivers in a group equal to or more than a threshold, it is preferable to allow simultaneous power supply by adjusting the power distribution in power supply within the same group, while performing time-division power supply to power receivers across different groups.

The threshold for classifying a plurality of power receivers into a plurality of groups on the basis of the kQ values may be varied in accordance with the scales and specifications of assumed wireless power transfer systems, and the numbers of groups and power receivers included in each group, in turn, change.

Figure 11:
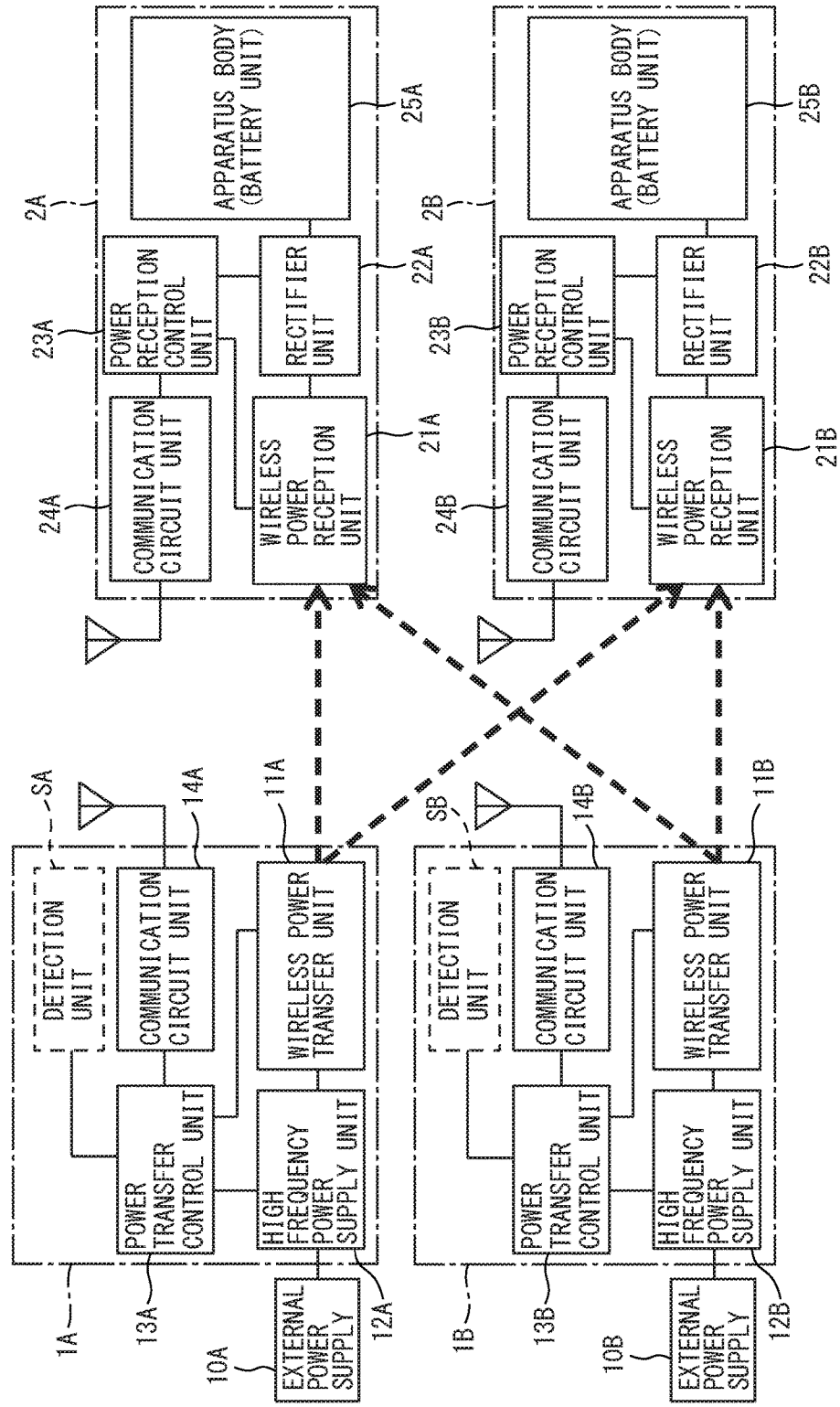
FIG. 11 is a block diagram depicting one example of a wireless power transfer system.

FIG. 11 is a block diagram depicting one example of a wireless power transfer system and illustrates an example in which it includes two power sources 1A and 1B and two power receivers 2A and 2B. The power sources 1A and 1B have the same configuration and include wireless power transfer units 11A and 11B, high frequency power supply units 12A and 12B, power transfer control units 13A and 13B, and communication circuit units 14A and 14B, respectively, as depicted in FIG. 11.

The high frequency power supply units 12A and 12B generate high frequency power, correspond to, for example, the high frequency power supply unit 12 in FIG. 3 mentioned earlier, and have a unique power supply impedance. Examples of the high frequency power supply units 12A and 12B include a constant-voltage power supply with its output impedance matched to 50Ω and an Hi-ZΩ power supply (constant-current power supply) having a high output impedance.

The power transfer control units 13A and 13B control the power transfer units 11A and 11B, and the communication circuit units 14A and 14B enable communication between each power source and the power receivers and may use, for example, a DSSS wireless LAN system based on IEEE 802.11b or Bluetooth (registered trademark).

The high frequency power supply units 12A and 12B receive power supplied from the external power supplies 10A and 10B, respectively, and the power transfer control units 13A and 13B receive signals from detection units SA and SB, respectively. The power sources 1A and 1B may serve as, for example, two power transfer units (11) provided in one power source 1, as a matter of course.

The wireless power transfer units 11A and 11B correspond to coils for magnetic field resonance and convert high frequency power supplied from the high frequency power supply units 12A and 12B into a magnetic field. The detection units SA and SB detect the relative positional relationship between the power sources 1A and 1B and the relative positional relationship between the power receivers 2A and 2B.

When, for example, the positional relationship between the power sources 1A and 1B is fixed (power source resonance coils 11a1 and 11a2 are fixed in a specific L-block shape), information to that effect is received by the power transfer control units 13A and 13B, and the power receivers 2A and 2B have the detection function, the detection units SA and SB may be omitted.

The power receivers 2A and 2B have the same configuration and include wireless power reception units 21A and 21B, rectifier units (power reception circuit units) 22A and 22B, power reception control units 23A and 23B, communication circuit units 24A and 24B, and apparatus bodies (battery units) 25A and 25B, respectively.

The power reception control units 23A and 23B are used to control the power receivers 2A and 2B, and the communication circuit units 24A and 24B enable communication between each power source and the power receivers and use, for example, a wireless LAN system or Bluetooth (registered trademark), as described earlier.

The wireless power reception units 21A and 21B correspond to coils for magnetic field resonance and convert wirelessly transferred power into a current. The rectifier units 22A and 22B convert AC currents obtained from the wireless power reception units 21A and 21B into DC currents, which may thus be used in battery charging or in the apparatus bodies.

As described above, the power sources 1A and 1B and the power receivers 2A and 2B perform communication via their communication circuit units 14A, 14B, 24A, and 24B, respectively. At this time, for example, the power source 1A may even be used as a master (entire controller) so that the master (power source) 1A controls the other power source 1B and the power receivers 2A and 2B as slaves.

Switching between simultaneous power transfer and time-division power transfer, power distribution ratio adjustment in simultaneous power transfer, and the like are controlled by communication via the communication circuit units 14A and 14B of the power sources 1A and 1B and the communication circuit units 24A and 24B of the power receivers 2A and 2B.

Specifically, for example, Q values in the respective power receivers 2A and 2B are communicated to a master (e.g., the power source 1A) which controls wireless power transfer, via the communication circuit unit 14A of the power source 1A and the communication circuit units 24A and 24B of the power receivers 2A and 2B.

In simultaneous power supply, for example, the power distribution ratio is adjusted by shifting the capacitance ($C_A$) of the capacitor in the power receiver resonance coil of the power receiver 2B from the resonance point via the communication circuit unit 14A of the power source 1A and the communication circuit unit 24B of the power receiver 2B. Specifically, the value of the capacitance of a capacitor 212 in the power receiver resonance coil 21a depicted in FIG. 5A mentioned earlier is controlled to adjust the power distribution ratio between the power receivers 2A and 2B.

In time-division power supply, for example, power receivers which perform wireless power supply are switched via the communication circuit unit 14A of the power source 1A and the communication circuit units 24A and 24B of the power receivers 2A and 2B.

Specifically, for example, a switch 213 in the power receiver resonance coil 21a depicted in FIG. 5A mentioned earlier is controlled to perform control to sequentially turn on only switches 213 of power receivers which perform wireless power supply. Alternatively, for example, a switch 213 in the power receiver resonance coil 21a depicted in FIG. 5B mentioned earlier is controlled to perform control to sequentially turn off only switches 213 of power receivers which perform wireless power supply.

Note that power transfer between the wireless power transfer units 11A and 11B and the wireless power reception unit 21A or 21B is not limited to that which uses magnetic field resonance, and a power transfer scheme which uses electric field resonance, or electromagnetic induction or electric field induction, for example, is also applicable.

As described earlier, in a wireless power transfer system including a plurality of power sources (power source coils) and a plurality of power receivers, power supply control which uses kQ values has been attracting attention and various researches are being conducted.

Unfortunately, in the wireless power transfer system, no useful proposals have currently been made to accurately calculate a k value, and accordingly a kQ value with each power receiver. In other words, it is difficult to accurately calculate a kQ value with each power receiver in the wireless power transfer system.

An embodiment of a power receiver, a wireless power transfer system, and a kQ-value calculation method will be described in detail below with reference to the accompanying drawings. The present embodiment is applicable to a wireless power transfer system including at least one power source and at least one power receiver.

An example in which a kQ value with one power receiver is obtained will be given in the following description, but when the wireless power transfer system includes a plurality of power receivers, the power receivers are sequentially turned on one by one to obtain a kQ value with each power receiver.

For example, in the example depicted in FIG. 11, when the power source 1A (the power transfer control unit 13A) serves as a master to control the entire system, the wireless power reception unit 21A of the power receiver 2A is activated and the wireless power reception unit 21B of the power receiver 2B is stopped to calculate a kQ value of the power receiver 2A.

When, for example, each of the wireless power reception units 21A and 21B of the power receivers 2A and 2B includes the power receiver resonance coil 21a depicted in FIG. 5A described earlier, the switch 213 of the power receiver resonance coil 21a in the power receiver 2A is turned on and the switch 213 in the power receiver 2B is turned off.

When the wireless power transfer system includes a plurality of power sources, kQ values with each power receiver may be calculated for the plurality of power sources, but the power sources may even be sequentially turned on one by one to obtain kQ values with each power receiver for the respective power sources. These operations are performed as appropriate in accordance with the application of the obtained kQ values or various types of control based on the kQ values.

When a kQ value with each power receiver is obtained, and, for example, when the Q value indicating the degree of loss of a magnetic field (electric field) in each power receiver (power receiver resonance coil) is known, a k value indicating the degree of coupling of magnetic fields (electric fields) may even be calculated and used to perform various types of control.

Figure 12A:
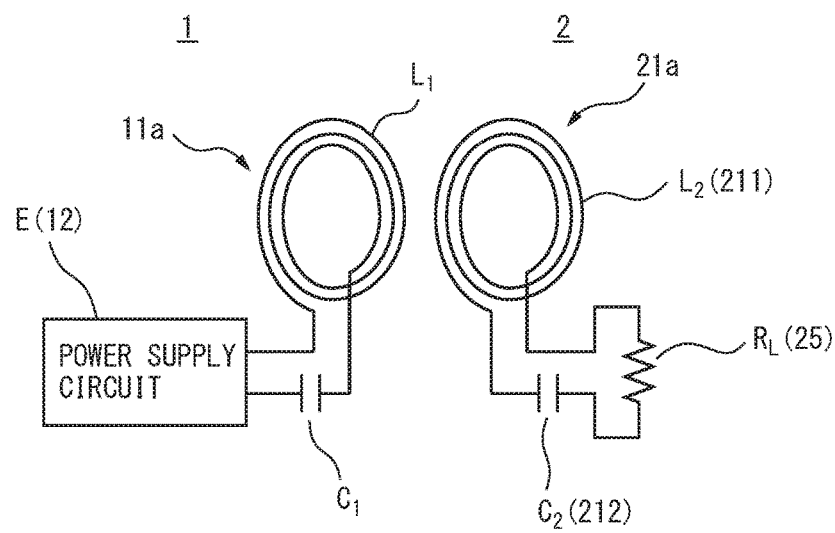
FIG. 12A is a diagram (1) for illustrating a kQ value applied to the present embodiment.
Figure 12B:
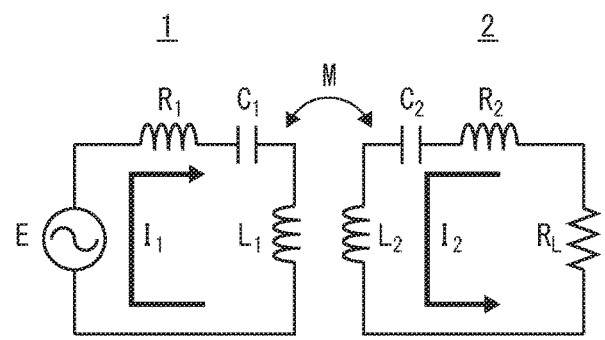
FIG. 12B is a diagram (2) for illustrating the kQ value applied to the present embodiment.
Figure 12C:
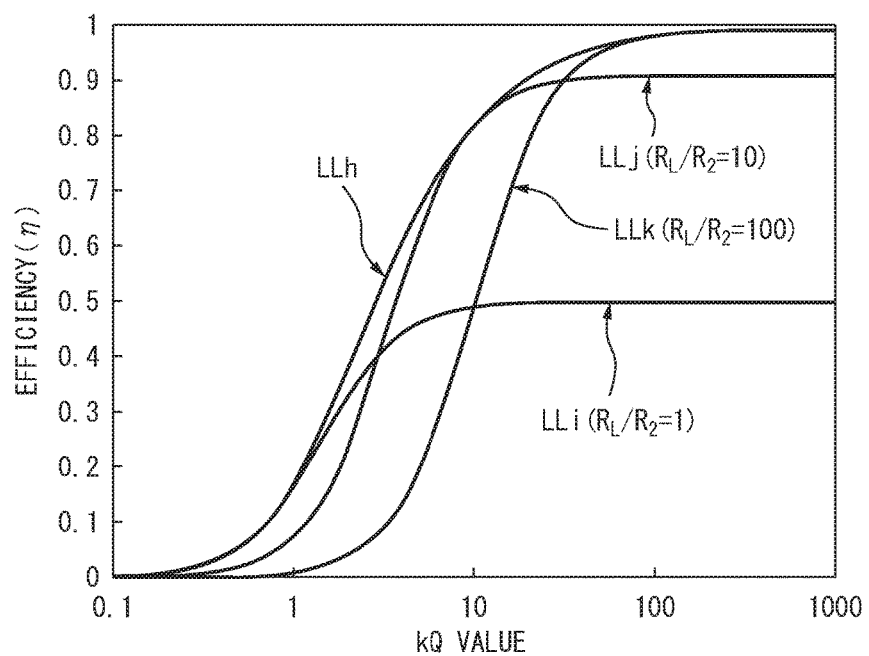
FIG. 12C is a diagram (3) for illustrating the kQ value applied to the present embodiment.

FIG. 12A to FIG. 12C are diagrams for illustrating a kQ value applied to the present embodiment. FIG. 12A is a diagram conceptually depicting the power source 1 (the power source resonance coil 11a) and the power receiver 2 (the power receiver resonance coil 21a) and corresponds to, for example, an example of the transmission coil depicted in FIG. 4C described earlier.

FIG. 12B is a diagram depicting an equivalent circuit for the power source 1 and the power receiver 2 in FIG. 12A, and FIG. 12C is a diagram depicting the relationship between the efficiency ($\eta$) based on $R_L/R_2$ and the kQ value. Note that the transmission coil (the wireless power transfer unit and the wireless power reception unit) is not limited to that depicted in FIG. 4C and may use structures depicted in, for example, FIG. 3, FIG. 4A, and FIG. 4B, as a matter of course.

Power transfer which uses the magnetic field (electric field) between one power source 1 (the power source resonance coil 11a) and one power receiver 2 (the power receiver resonance coil 21a) may be considered as depicted in FIG. 12A, and this is represented by the equivalent circuit depicted in FIG. 12B.

Referring to FIG. 12B, reference signs $R_1$ and $L_1$ denote the loss (the resistance value) and the self-inductance of the power source resonance coil 11a (the coil); and $R_2$ and $L_2$, the resistance value and the self-inductance of the power receiver resonance coil 21a (the coil 211). Reference sign $R_L$ denotes the load resistance of the object to be supplied with power (the battery unit 25); and M, the mutual inductance between the power source resonance coil 11a and the power receiver resonance coil 21a.

Reference sign $C_1$ denotes the capacitance of the power source resonance coil 11a (the capacitor); $C_2$, the capacitance of the power receiver resonance coil 21a (the capacitor 212); $I_1$ and $I_2$, the currents flowing through the power source resonance coil 11a and the power receiver resonance coil 21a; and E, a power supply circuit (12).

As described earlier, the kQ value, the k value, and the Q values ($Q_1$ and $Q_2$) of the power source and the power receiver are given by the Equation (1) to Equation (3) below:

$$kQ = k\sqrt{Q_1 \cdot Q_2} \tag{1}$$

$$k = \sqrt{\frac{M_{12}}{L_1 \cdot L_2}} \tag{2}$$

$$Q_1 = \frac{\omega L_1}{R_1},\ Q_2 = \frac{\omega L_2}{R_2} \tag{3}$$

Note that the efficiency of the power receiver resonance coil 21a (the power receiver 2) changes depending not only on the resistance value $R_2$ of the coil 211 but also on the load resistance $R_L$ of the object to be supplied with power. For example, in the power receiver, the resistance value $R_2$ of the coil 211 in the power receiver resonance coil 21a is designed aiming at minimization, while the load resistance $R_L$ changes depending on, for example, the charging rate of the secondary battery. Referring to FIG. 12C, the efficiency η is given by the Equation (4) below:

$$\eta = \frac{1}{\left\{\frac{1}{kQ^2}\left(\frac{R_L}{R_2}+1\right)+1\right\}\left(1+\frac{R_2}{R_L}\right)} \quad (4)$$

The fact that the relationship between the kQ value and the efficiency (η) considerably changes depending on the load resistance $R_L$ will be described below with reference to FIG. 12C. Referring to FIG. 12C, a curve LLh represents characteristics when the ratio between the resistance value $R_2$ of the coil 211 and the load resistance $R_L$ is always optimum (the ideal efficiency or the maximum efficiency), LLi represents characteristics when $R_L/R_2=1$, LLj represents characteristics when $R_L/R_2=10$, and LLk represents characteristics when $R_L/R_2=100$.

As is obvious from FIG. 12C, the relationship between the kQ value and the efficiency considerably changes depending on the value of $R_L/R_2$. As for the Q value indicating the degree of energy loss, for example, ω and $L_1$ in the power source resonance coil 11a and ω and $L_2$ in the power receiver resonance coil 21a may be regarded as being normally constant.

Figure 13:
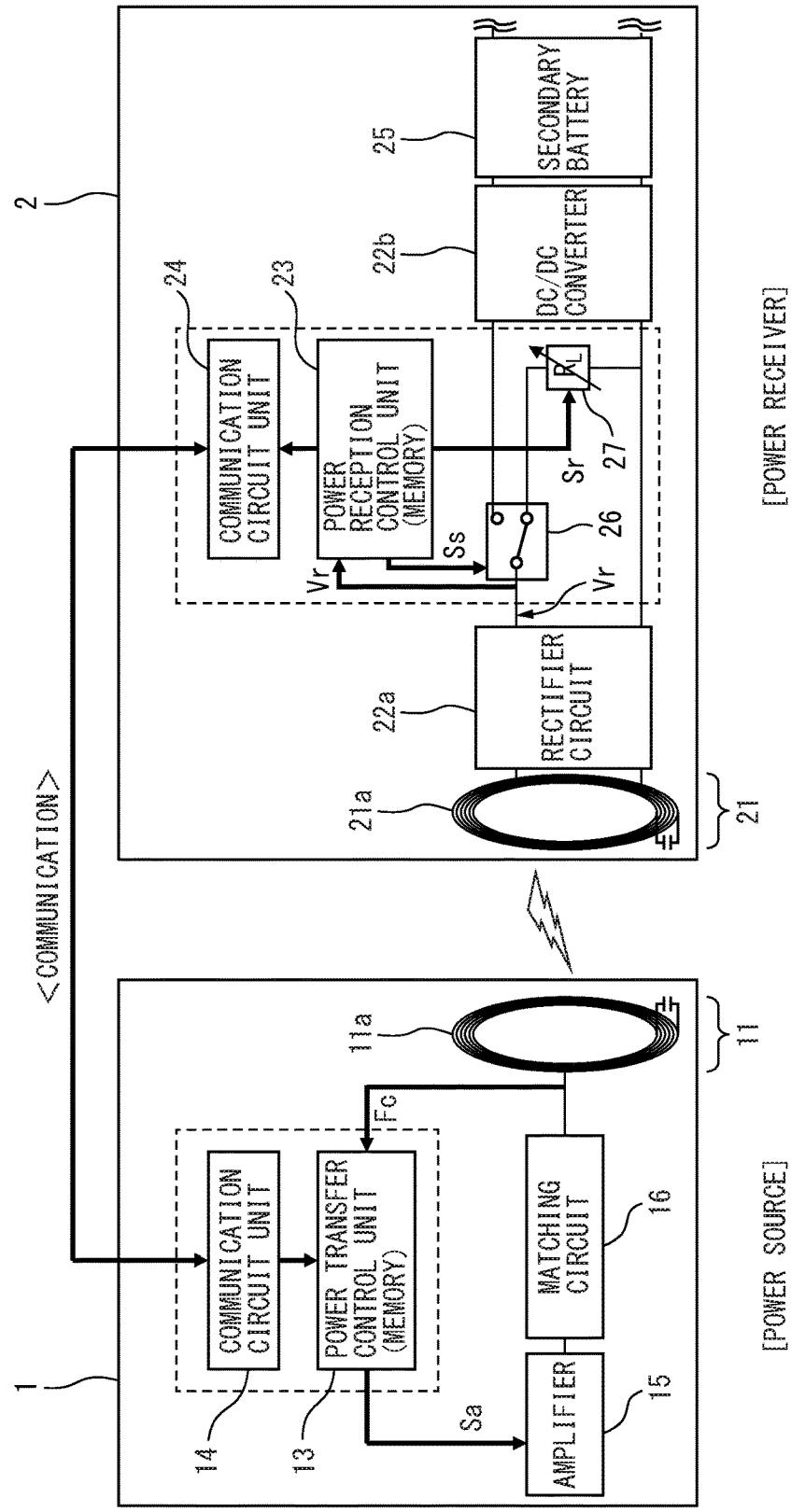
FIG. 13 is a block diagram for illustrating a wireless power transfer system of a first embodiment.

FIG. 13 is a block diagram for illustrating a wireless power transfer system of a first embodiment. Although FIG. 13 depicts only one power source 1 and one power receiver 2, the wireless power transfer system of the present embodiment may include a plurality of power sources and a plurality of power receivers, as described earlier.

When the system includes a plurality of power receivers, for example, the power receivers are sequentially turned on one by one to obtain a kQ value with each power receiver. When the system includes a plurality of power sources, kQ values with each power receiver are calculated for the plurality of power sources, or the power sources are sequentially turned on one by one to obtain kQ values with each power receiver for the respective power sources.

The power source 1 includes a power source resonance coil 11a (a wireless power transfer unit 11), a power transfer control unit (including a memory) 13, a communication circuit unit 14, an amplifier 15, and a matching circuit 16, as depicted in FIG. 13.

The power transfer control unit 13, for example, receives a voltage and current input waveform Fc of the power source resonance coil 11a, controls the output of the amplifier 15 in accordance with an amplifier control signal Sa, and drives the power source resonance coil 11a via the matching circuit 16.

The power transfer control unit 13 is designed to receive a voltage and current input waveform Fc of the power source resonance coil 11a to detect a transferred power $P_1$. The power transfer control unit 13 is equipped with a memory to, for example, store a loss $Q_1$ in the coil of the power source resonance coil 11a in advance.

The power receiver 2 includes a power receiver resonance coil 21a (a wireless power reception unit 21: a power receiver coil), a rectifier circuit 22a, a DC/DC converter 22b, a power reception control unit (including a memory) 23, a communication circuit unit 24, a secondary battery 25, a switch 26, and a power detection resistor 27. The DC/DC converter 22b and the secondary battery 25 correspond to an internal circuit which uses power from the power receiver coil (21, 21a).

The switch 26 applies a DC received power voltage Vr extracted via the power receiver resonance coil 21a and the rectifier circuit 22a to be switchable to the power detection resistor (load resistor) 27 and the DC/DC converter 22b, in accordance with a switching control signal Ss from the power reception control unit 23. The load resistor 27 serves as a variable resistor, the resistance value of which is controlled in accordance with a resistance value control signal Sr from the power reception control unit 23.

Upon receiving the received power voltage Vr from the rectifier circuit 22a, the power reception control unit 23, for example, controls the switch 26 in accordance with the switching control signal Ss to apply the received power voltage Vr to the load resistor 27 to detect a received power $P_2$ obtained by the resistance value $R_L$ of the load resistor 27.

Referring to FIG. 13 (and FIG. 14), the switch 26 and the load resistor 27 are located downstream of the rectifier circuit 22a to detect a received power $P_2$ from the rectified DC received power voltage Vr and the resistance value $R_L$ of the load resistor 27, but they may be located upstream of the rectifier circuit 22a.

In other words, a received power $P_2$ may also be detected from an AC received power voltage Vr' obtained by the power receiver resonance coil 21a and the resistance value $R_L$ of the load resistor 27, as in a third embodiment depicted in FIG. 15 (to be described later).

Thus, the power reception control unit 23 may obtain a resistance ratio $R_L/R_2$ between the resistance value $R_L$ of the load resistor 27 and the resistance value $R_2$ of the power receiver resonance coil 21a (the coil 211) and a received power $P_2$ and communicates detection information of the received power to the power transfer control unit 13. The power reception control unit 23 is equipped with a memory to, for example, store a loss $Q_2$ in the coil 211 of the power receiver resonance coil 21a in advance.

As the detection information of the received power from the power receiver 2 (the power reception control unit 23) to the power source 1 (the power transfer control unit 13), for example, the received power voltage Vr, the resistance ratio $R_L/R_2$, and the loss $Q_2$ may be directly communicated to the power transfer control unit 13, which may then calculate, for example, the received power $P_2$.

Alternatively, the power receiver 2 (the power reception control unit 23) may receive information such as the transferred power $P_1$ and the loss $Q_1$ of the power source resonance coil 11a from the power source 1 (the power transfer control unit 13) through communication and calculate a kQ value (k value).

The resistance value $R_L$ of the load resistor 27 is controlled in accordance with the resistance value control signal Sr from the power reception control unit 23, preferably so that $R_L/R_2$ is low, i.e., the resistance value $R_L$ of the load resistor 27 changes from smaller to larger values, in terms of ensuring a given detection accuracy at a low efficiency, as is obvious from each characteristic curve depicted in FIG. 12C.

The power reception control unit 23, for example, receives power transfer conditions (power supply timing information) from the power transfer control unit 13 through communication (the communication circuit unit 24 on the power receiver side and the communication circuit unit 14 on the power source side) and communicate the received power $P_2$ and the loss $Q_2$ for a predetermined value of $R_L/R_2$ to the power transfer control unit 13.

Thus, for example, the power transfer control unit 13 that serves as a master for the wireless power transfer system to control the entire system may recognize the loss $Q_1$ of the coil of the power source resonance coil 11a, the transferred power $P_1$, the loss $Q_2$ of the coil of the power receiver resonance coil 21a, and the value of $R_L/R_2$.

The power transfer control unit 13 may estimate a kQ value with the power receiver 2 from the resistance ratio $R_L/R_2$ and the measurement efficiency ($P_2/P_1$) on the basis of Equation (4) by recognizing the transferred power $P_1$ of the power source 1, the value of $R_L/R_2$ in the power receiver 2, and the received power $P_2$ of the power receiver 2.

More specifically, for Equation (4) described with reference to FIG. 12A to FIG. 12C, a kQ value may be calculated (estimated) using the obtained measurement efficiency ($P_2/P_1$) as the efficiency T and further using the obtained resistance ratio $R_L/R_2$ as $R_L/R_2$ or its reciprocal as $R_2/R_L$. In other words, according to the first embodiment, the calculation accuracy of a kQ value in the power receiver may be improved. The improvement in calculation accuracy of a kQ value may also be achieved as the same effect in the following second and third embodiments.

Since a Q value may be obtained from $Q_1$ stored in the memory of the power transfer control unit 13 and $Q_2$ stored in the memory of the power reception control unit 23, a k value may also be calculated as long as a kQ value may be calculated.

The value of the loss $Q_2$ of the coil of the power receiver resonance coil 21a may even be obtained by presetting, on the power source side, for example, a table which may be used to look up the value of $Q_2$ from information representing the type or model number of the power receiver, instead of its communication from the power reception control unit 23 to the power transfer control unit 13.

The aforementioned processing may be performed in, for example, test power transfer in which low power is transferred from the power source 1, before final power transfer in which the secondary battery 25 in the power receiver 2 is charged using power transferred from the power source 1.

Figure 14:
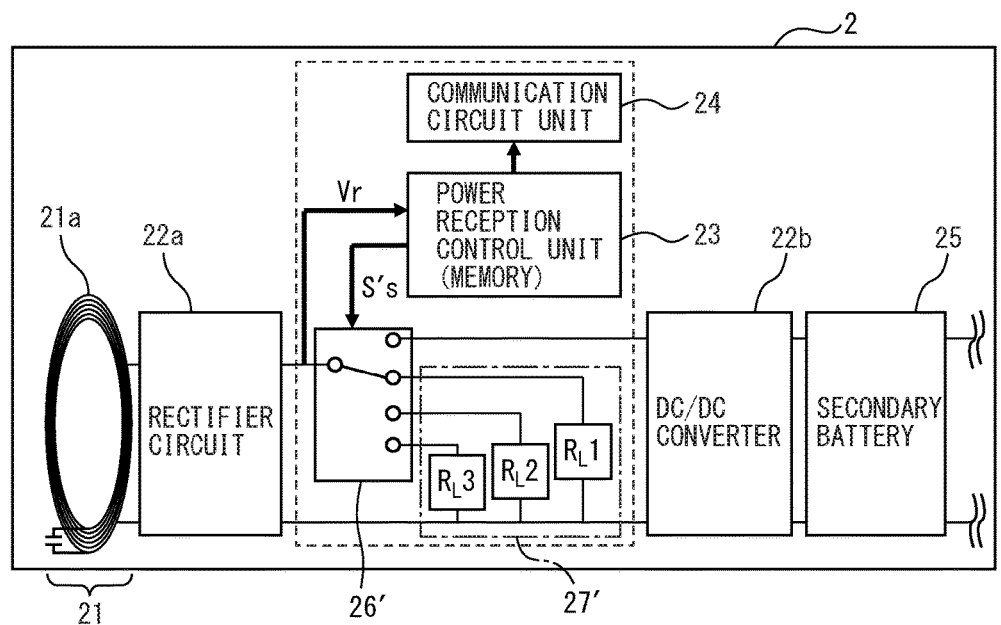
FIG. 14 is a block diagram for illustrating a power receiver in a wireless power transfer system of a second embodiment.

FIG. 14 is a block diagram for illustrating a power receiver in a wireless power transfer system of a second embodiment. As is obvious from a comparison of FIG. 14 with FIG. 13 mentioned above, the power receiver in the second embodiment is different from the power receiver in the first embodiment in terms of the structures of a switch 26' and a load resistor 27'.

More specifically, according to the first embodiment, the load resistor 27 serves as a variable resistor, the resistance value of which is controlled in accordance with the resistance value control signal Sr from the power reception control unit 23, while according to the second embodiment, the load resistor 27' includes a plurality of (in FIG. 14, three) resistor elements $R_L1$ to $R_L3$.

In other words, in the power receiver of the first embodiment, the load resistor 27 serves as a variable resistor, the resistance value of which is controlled in accordance with the resistance value control signal Sr from the power reception control unit 23. In contrast to this, in the power receiver of the second embodiment, the load resistor 27' includes a plurality of resistor elements $R_L1$ to $R_L3$, one of which is selected by the switch 26' operating in accordance with a switching control signal Ss' from a power reception control unit 23.

More specifically, the switch 26' applies a received power voltage Vr to be switchable to one of the resistor elements $R_L1$ to $R_L3$ in the load resistor 27' or to a DC/DC converter 22b, in accordance with the switching control signal Ss' from the power reception control unit 23.

The resistance values of the respective resistor elements $R_L1$ to $R_L3$ may be set such that, for example, the value of the resistance ratio $R_L/R_2$ becomes about 1, 10, and 100, as depicted in FIG. 12C. The number of resistor elements mounted in the load resistor 27', the set value of each resistor element, and the like may be variously set, as a matter of course.

Figure 15:
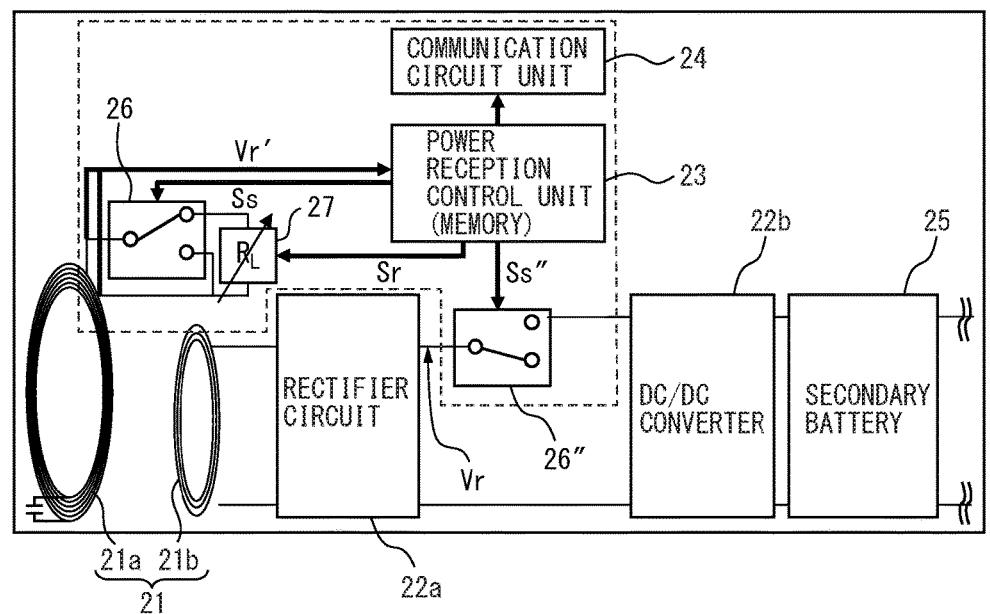
FIG. 15 is a block diagram for illustrating a power receiver in a wireless power transfer system of a third embodiment.

FIG. 15 is a block diagram for illustrating a power receiver in a wireless power transfer system of a third embodiment. In the power receiver of the third embodiment, a wireless power reception unit 21 includes a power receiver resonance coil 21a and a power extraction coil 21b, as depicted in FIG. 15. In other words, the power receiver resonance coil 21a and the power extraction coil 21b correspond to the power receiver coil (the wireless power reception unit 21).

This arrangement is the same as in, for example, the wireless power reception unit 21 of the power receiver depicted in FIG. 3 and FIG. 4B mentioned earlier, and the power receiver resonance coil 21a supplies power to the power extraction coil 21b located very close to the power receiver resonance coil 21a, using electromagnetic induction.

The power receiver resonance coil 21a includes a switch 26 and a load resistor 27 and, for example, applies an AC received power voltage Vr' obtained by the power receiver resonance coil 21a to the load resistor 27 by switching the switch 26 at the time of test power transfer.

A switching control signal Ss from a power reception control unit 23 which controls the switch 26, and a resistance value control signal Sr which controls a resistance value $R_L$ of the load resistor 27 are the same as those described with reference to FIG. 13.

However, in the power receiver of the third embodiment, the power reception control unit 23 detects a received power $P_2$ from the AC received power voltage Vr' from the power receiver resonance coil 21a and the resistance value $R_L$ of the load resistor 27.

The power extraction coil 21b is connected to a rectifier circuit 22a and a DC received power voltage Vr extracted via the rectifier circuit 22a is applied to a DC/DC converter 22b via a switch 26".

The switches 26 and 26" are controlled to synchronize their switching timings in accordance with switching control signals Ss and Ss" from the power reception control unit 23. More specifically, when the switch 26 applies an AC received power voltage Vr' obtained by the power receiver resonance coil 21a to the load resistor 27, the switch 26" is inhibited from applying a DC received power voltage Vr obtained by the rectifier circuit 22a to the DC/DC converter 22b.

In other words, for example, at the time of test power transfer, the power reception control unit 23 controls the switch 26 and the resistance value $R_L$ of the load resistor 27 to calculate a received power $P_2$ from the AC received power voltage Vr' and the resistance value $R_L$ (the resistance ratio $R_L/R_2$).

At this time, the power reception control unit 23 controls the switch 26" to set the input of the DC/DC converter 22b at a high impedance. Upon this test power transfer, the power reception control unit 23 calculates a received power $P_2$ and communicates the calculated received power $P_2$ to a power transfer control unit 13 of a power source 1, together with information such as $R_L/R_2$.

In final power transfer, the power reception control unit 23 controls the switch 26 to disconnect the load resistor 27 from the power receiver resonance coil 21a, and controls the switch 26" to apply a received power voltage Vr from the rectifier circuit 22a to the DC/DC converter 22b.

In the third embodiment, the switch 26 and the load resistor 27 may even be, for example, a switch 26' and a load resistor 27' including a plurality of resistor elements $R_L1$ to $R_L3$, both having the same structures as in the second embodiment described with reference to FIG. 14.

Figure 16:
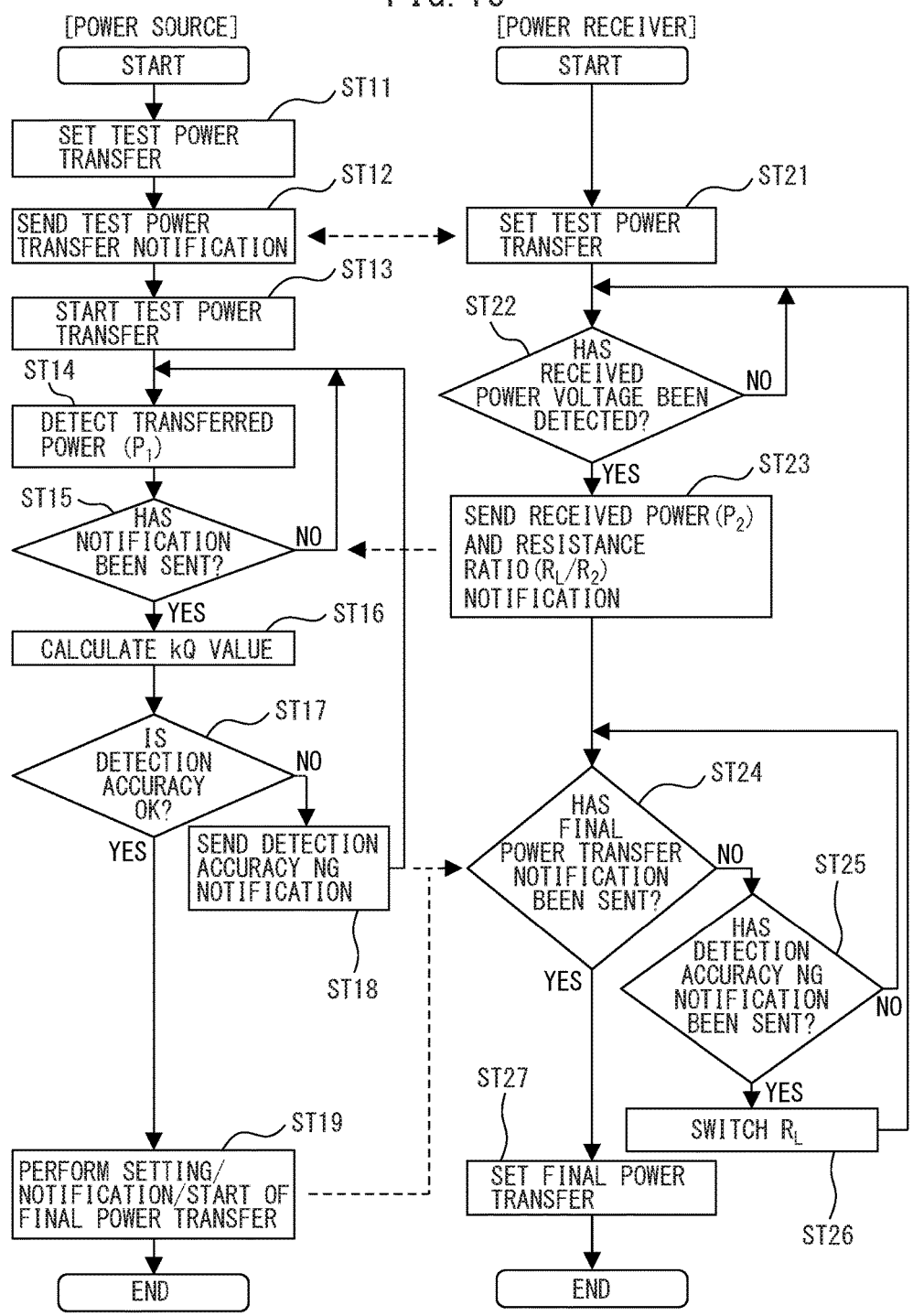
FIG. 16 is a flowchart for illustrating one example of processing in a kQ-value calculation method of the present embodiment.

FIG. 16 is a flowchart for illustrating one example of kQ-value calculation processing of the present embodiment. Referring to FIG. 16, the processes on the power source side are indicated by steps ST11 to ST19 and the processes on the power receiver side are indicated by steps ST21 to ST27.

As depicted in FIG. 16, when kQ-value calculation processing is started, in the power source (1), test power transfer is set in step ST11 and the process advances to step ST12, in which a test power transfer notification is sent and the process advances to step ST13, in which test power transfer is started. Note that in test power transfer, a relatively low power for the test is transferred from the power source 1.

In the power source 1, a transferred power $P_1$ is detected in step ST14. In other words, in the power source 1, the power transfer control unit 13 may receive a voltage and current input waveform Fc of a power source resonance coil 11a to detect a transferred power $P_1$.

The process advances to step ST15, in which it is determined whether a notification has been sent from the power receiver 2, i.e., the process waits until a notification is sent from the power receiver 2, and when it is determined that a notification has been sent from the power receiver 2, the process advances to step ST16.

In the power receiver (2), a test power transfer notification sent from the power source 1 in step ST12 is received, and test power transfer is set in step ST21. In other words, in the power receiver 2, for example, the switch 26 switches connection from the DC/DC converter 22b to the load resistor (the power detection resistor) 27 through communication by the communication circuit units 14 and 24 or by receiving power for test power transfer from the power source 1.

Specifically, a received power voltage Vr extracted via the power receiver resonance coil 21a and the rectifier circuit 22a is applied to the load resistor 27 by switching the switch 26 in accordance with the switching control signal Ss from the power reception control unit 23. At this time, the resistance value ($R_L$) of the load resistor 27 is variably controlled to, for example, change from smaller to larger values in accordance with the resistance value control signal Sr from the power reception control unit 23.

The process advances to step ST22, in which it is determined whether a received power voltage Vr has been detected, and when it is determined that a received power voltage Vr has been detected, the process advances to step ST23, in which the received power $P_2$ and the resistance ratio ($R_L/R_2$) are sent to the power source 1 through communication (the communication circuit units 24 and 14). In other words, since the power reception control unit 23 recognizes the resistance value ($R_L$) of the variably-controlled load resistor 27, it may calculate a value of $R_L/R_2$ and a received power $P_2$ and notify the power transfer control unit 13 of the power source 1 of the calculated values through communication.

In the power source 1, upon receiving the information notified by the power receiver 2, a kQ value is calculated in step ST16. In other words, since the power transfer control unit 13 of the power source 1 may determine the transferred power $P_1$ of the power source 1, the value of $R_L/R_2$ in the power receiver 2, and the received power $P_2$ of the power receiver 2, it may calculate a kQ value of the power receiver 2 from the resistance ratio $R_L/R_2$ and the measurement efficiency ($P_2/P_1$).

Specifically, for Equation (4) described with reference to FIG. 12A to FIG. 12C, a kQ value may be calculated using the obtained measurement efficiency ($P_2/P_1$) as the efficiency η and further using the obtained resistance ratio $R_L/R_2$ as $R_L/R_2$ or its reciprocal as $R_2/R_L$.

When a kQ value with the power receiver 2 is obtained, since a Q value may be determined from $Q_1$ stored in the memory of the power transfer control unit 13 and $Q_2$ stored in the memory of the power reception control unit 23, a k value may also be calculated. Note that a kQ value or a k value may be calculated using a logical expression, but it may even be obtained by, for example, preparing and using a table.

In the power source 1, the process advances to step ST17, in which it is determined whether the detection accuracy falls within the tolerance and when it is determined that the detection accuracy falls outside the tolerance (detection accuracy NG or No Good), the process returns to step ST14, in which the same process is repeated and a predetermined notification is sent to the power receiver 2.

In other words, in the power receiver 2, it is determined in step ST24 that no final power transfer notification has been sent and the process advances to step ST25. In step ST25, it is determined that a detection accuracy NG notification has been sent and the process advances to step ST26, in which the resistance value $R_L$ of the load resistor 27 is switched to, for example, a larger value or is variably controlled and the process returns to step ST22, in which the same process is repeated.

When it is determined in step ST17 of the power source 1 that the detection accuracy falls within the tolerance (detection accuracy OK), the process advances to step ST19, in which setting/notification/start of final power transfer are performed and the process ends. In other words, the power source 1 actually starts final power transfer for charging the secondary battery 25 of the power receiver 2 and sends a notification of the final power transfer to the power receiver 2 through, for example, communication.

In response to the notification, in the power receiver 2, it is determined in step ST24 that a final power transfer notification has been sent and the process advances to step ST27, in which setting for final power transfer is performed. In other words, in the power receiver 2, the switch 26 switches connection from the load resistor 27 to the DC/DC converter 22b, for example, through communication or upon receiving power for final power transfer from the power source 1.

Specifically, a received power voltage Vr extracted via the power receiver resonance coil 21a and the rectifier circuit 22a is applied to the DC/DC converter 22b by switching the switch 26 in accordance with the switching control signal Ss from the power reception control unit 23.

For example, when the wireless power transfer system includes a plurality of power receivers, the power receivers are sequentially turned on one by one and test power transfer is performed to obtain a kQ value with each power receiver, as described earlier. Further, for example, when the $Q_1$ and $Q_2$ values are known in advance, a Q value may be obtained and a k value may, in turn, be calculated. The calculated kQ values or k values with the plurality of power receivers are applicable to various types of control, including selection of a power supply scheme and grouping of a plurality of power receivers, as described earlier.

All examples and conditional language recited herein are intended for pedagogical purposes to aid the reader in understanding the invention and the concepts contributed by the inventor to furthering the art.

Further, the above examples and conditional language are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alterations could be made hereto without departing from the spirit and scope of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power receiver configured to wirelessly receive power from at least one power source using one of magnetic field resonance and electric field resonance, the power receiver comprising:
   a power receiver coil configured to wirelessly receive the power from the power source;
   an internal circuit configured to use the power obtained by the power receiver coil;
   a power detection resistor configured to detect the power obtained by the power receiver coil;
   a switch configured to apply a received power voltage obtained by the power receiver coil by switching to the power detection resistor;
   a power reception control unit configured to control the power detection resistor and the switch; and
   a communication circuit unit configured to perform communication with the power source, and the communication circuit unit comprising detection information of a received power and power supply timing information, wherein
   the power reception control unit is configured to
      control a resistance value of the power detection resistor to calculate the received power from a resistance ratio between a resistance value of the power receiver coil and a resistance value of the power detection resistor, and the received power voltage obtained by the power receiver coil, and
      transfer the detection information of the calculated received power to the transmission circuit via the communication circuit unit.

2. The power receiver according to claim 1, wherein the switch is configured to apply the received power voltage obtained by the power receiver coil by switching to the power detection resistor and the internal circuit.

3. The power receiver according to claim 2, wherein the power detection resistor comprises a variable resistor, the resistance value of which is variably controlled by the power reception control unit, and
   the switch connects the power receiver coil by switching to the power detection resistor and the internal circuit.

4. The power receiver according to claim 2, wherein the power detection resistor comprises a plurality of resistor elements, and
   the switch is configured to connect the power receiver coil by switching to one of the plurality of resistor elements and the internal circuit.

5. The power receiver according to claim 1, wherein the power receiver coil comprises:
   a power receiver resonance coil configured to wirelessly receive the power from the power source; and
   a power extraction coil configured to receive the power from the power receiver resonance coil using electromagnetic induction, and
   the switch comprises:
   a first switch configured to apply a first received power voltage obtained by the power receiver resonance coil by switching to the power detection resistor; and
   a second switch configured to apply a second received power voltage obtained by the power extraction coil by switching to the internal circuit.

6. The power receiver according to claim 1, wherein the power reception control unit comprises a memory which stores a loss of the power receiver coil.

7. The power receiver according to claim 1, wherein the internal circuit comprises a secondary battery, and
   the secondary battery is charged using the power obtained by the power receiver coil.

8. A wireless power transfer system comprising at least one power source, and at least one power receiver which wirelessly receives power from the power source using one of magnetic field resonance and electric field resonance, wherein
   the power receiver comprises:
   a power receiver coil configured to wirelessly receive the power from the power source;
   an internal circuit configured to use the power obtained by the power receiver coil;
   a power detection resistor configured to detect the power obtained by the power receiver coil;
   a switch configured to apply a received power voltage obtained by the power receiver coil by switching to the power detection resistor;
   a power reception control unit configured to control the power detection resistor and the switch; and
   a first communication circuit unit configured to perform communication with the power source, comprising detection information of a received power and power supply timing information, and
   the power source comprises:
   a power source coil configured to wirelessly transfer power to the power receiver;
   a power transfer control unit configured to calculate a kQ value on the basis of a transferred power to the power receiver and the detection information from the power receiver; and
   a second communication circuit unit configured to perform communication with the power receiver, comprising the detection information and the power supply timing information, wherein
   the power reception control unit is configured to
      control a resistance value of the power detection resistor to calculate the received power from a resistance ratio between a resistance value of the power receiver coil and a resistance value of the power detection resistor, and the received power voltage obtained by the power receiver coil, and transfer the detection information of the calculated received power to the transmission circuit via the communication circuit unit.

9. The wireless power transfer system according to claim 8, wherein the power transfer control unit comprises a memory which stores a loss of the power source coil.

10. A kQ-value calculation method for obtaining, a kQ value of a power receiver which wirelessly receives power from at least one power source using one of magnetic field resonance and electric field resonance, as a product of a k value indicating a degree of coupling of one of a magnetic field and an electric field between the power source and the power receiver and a Q value indicating a degree of loss of one of a magnetic field and an electric field, wherein the power receiver comprises:
    a power receiver coil which wirelessly receives the power from the power source;
    an internal circuit which uses the power obtained by the power receiver coil; and
    a power detection resistor which detects the power obtained by the power receiver coil, and the kQ-value calculation method comprises:
    controlling a resistance value of the power detection resistor to calculate a received power from a resistance ratio between a resistance value of the power receiver coil and a resistance value of the power detection resistor, and the received power voltage obtained by the power receiver coil;
    calculating a measurement efficiency from a transferred power output from the power source, and the received power; and
    calculating the kQ value of the power receiver from the resistance ratio and the measurement efficiency.

11. The kQ-value calculation method according to claim 10, further comprising:
    calculating the Q value from a loss of the power receiver coil in the power receiver and a loss of the power source coil in the power source; and
    calculating a k value from the calculated kQ value.

12. The kQ-value calculation method according to claim 10, wherein
    the calculating the kQ value is performed in test power transfer in which low power is transferred from the power source.

13. The kQ-value calculation method according to claim 10, wherein
    the calculating the kQ value is performed in the power source.

* * * * *